May 8, 1945.　　　R. F. DIRKES ET AL　　　2,375,541
TELEGRAPH PRINTER
Filed July 8, 1942　　　8 Sheets-Sheet 4

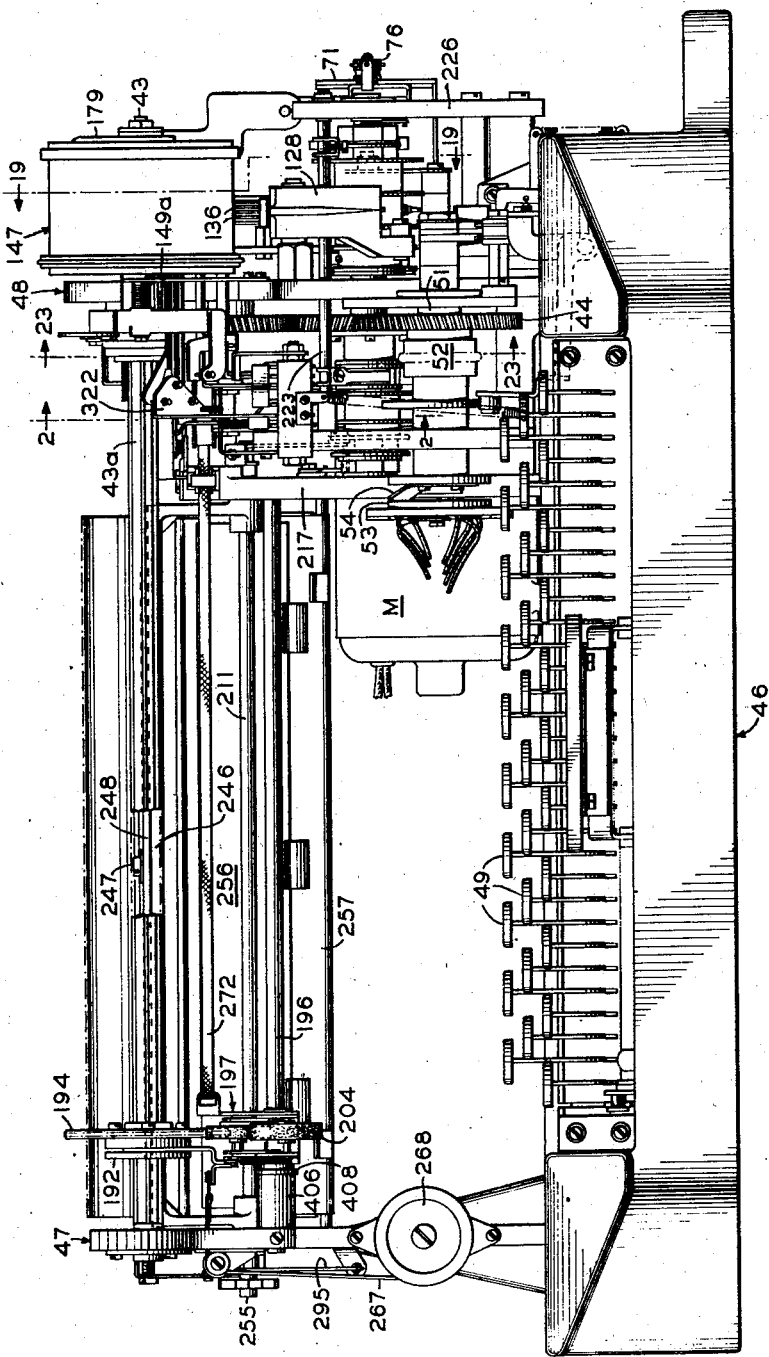

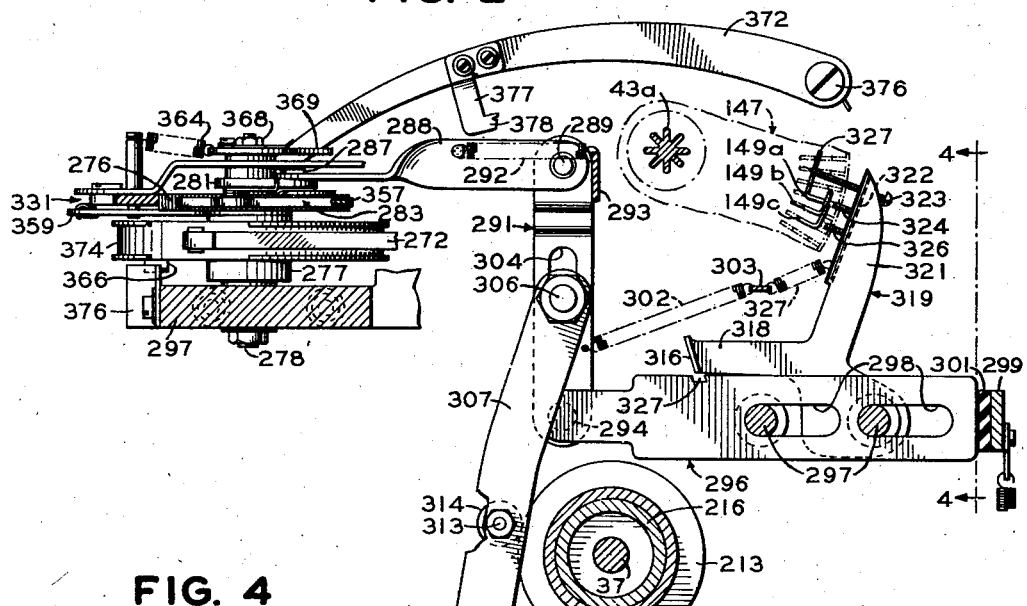
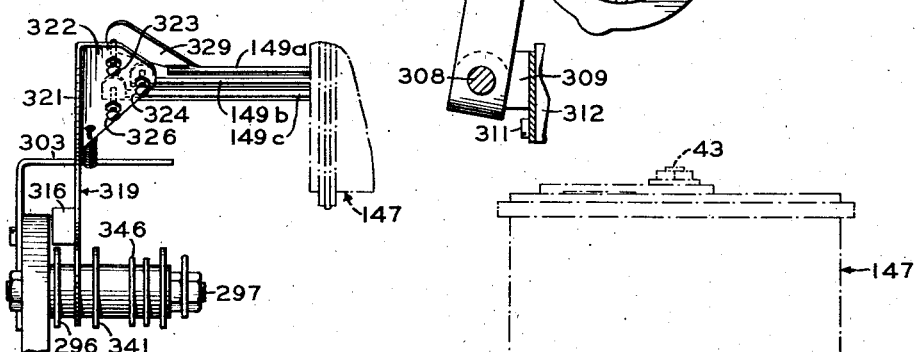
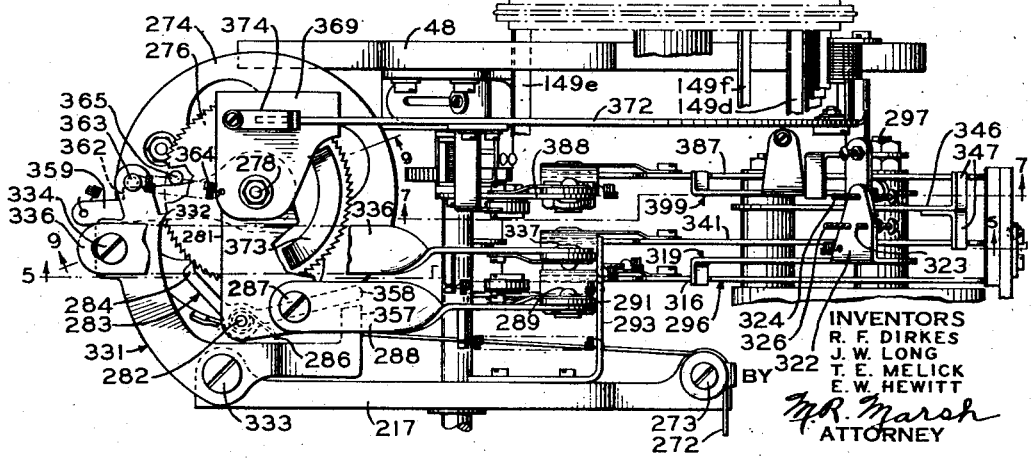

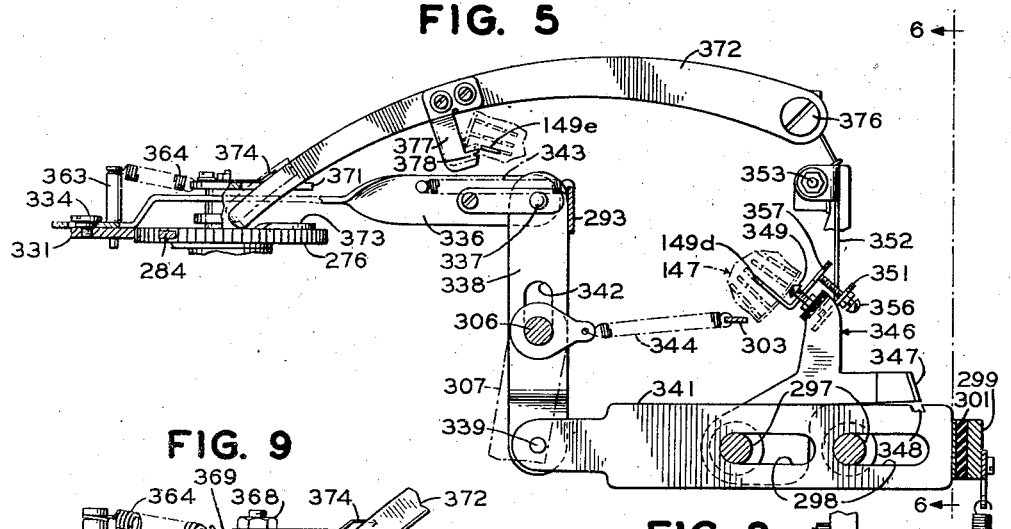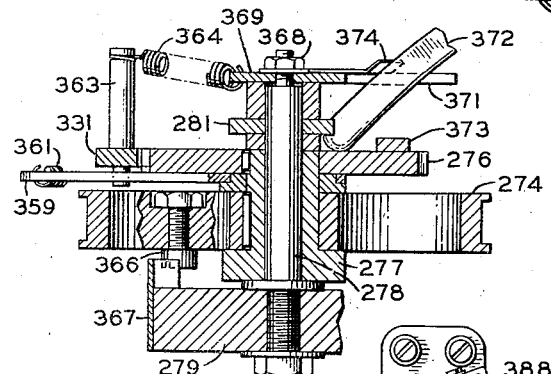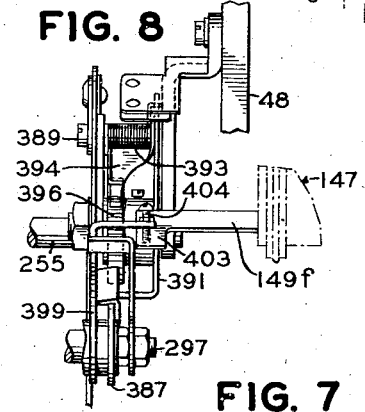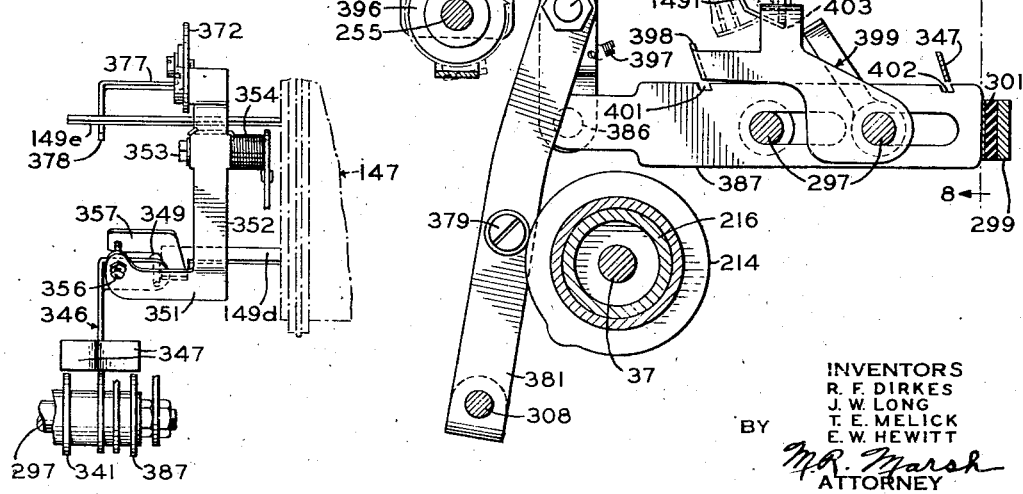

INVENTORS
R. F. DIRKES
J. W. LONG
T. E. MELICK
E. W. HEWITT
BY M.R. Marsh
ATTORNEY May 8, 1945.  R. F. DIRKES ET AL  2,375,541
TELEGRAPH PRINTER
Filed July 8, 1942   8 Sheets-Sheet 5
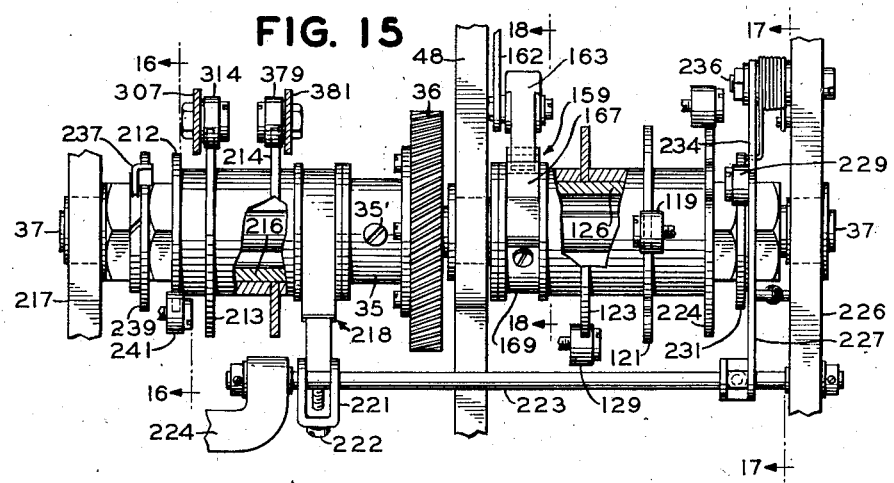
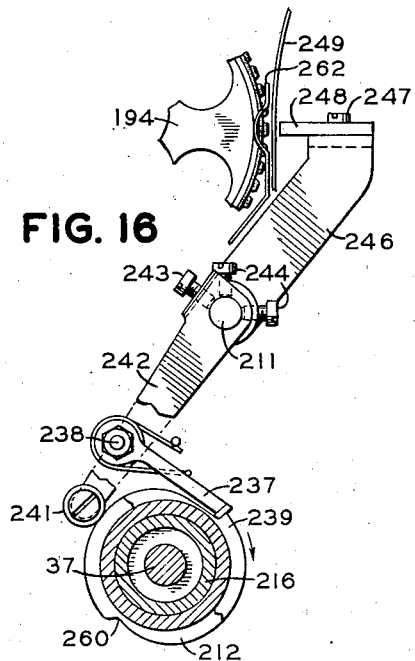
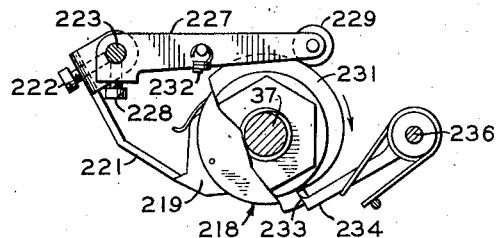
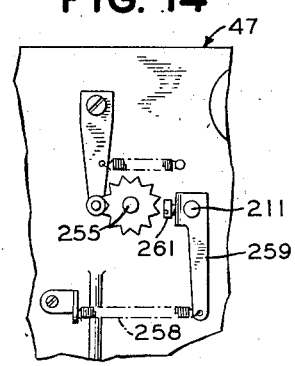
INVENTORS
R. F. DIRKES
J. W. LONG
T. E. MELICK
E. W. HEWITT
BY M. R. Marsh
ATTORNEY May 8, 1945.  R. F. DIRKES ET AL  2,375,541
TELEGRAPH PRINTER
Filed July 8, 1942  8 Sheets-Sheet 6

INVENTORS
R. F. DIRKES
J. W. LONG
T. E. MELICK
E. W. HEWITT
BY
ATTORNEY

May 8, 1945.    R. F. DIRKES ET AL    2,375,541
TELEGRAPH PRINTER
Filed July 8, 1942    8 Sheets-Sheet 7

INVENTORS
R. F. DIRKES
J. W. LONG
BY  T. E. MELICK
E. W. HEWITT
M.R. Marsh
ATTORNEY

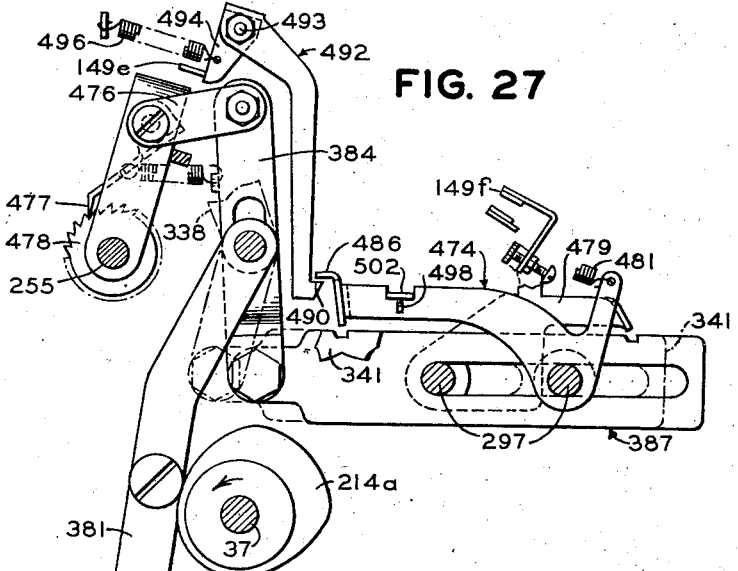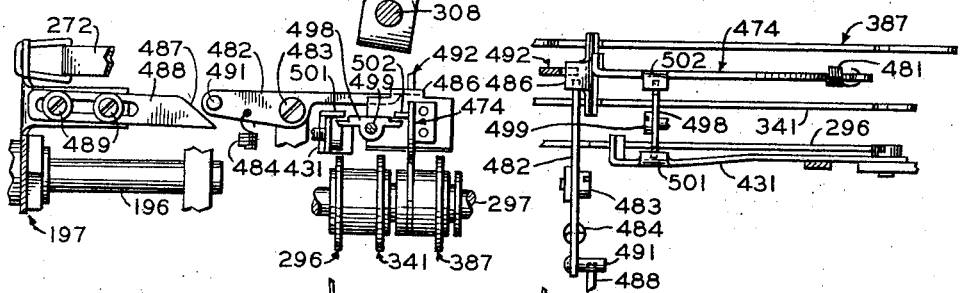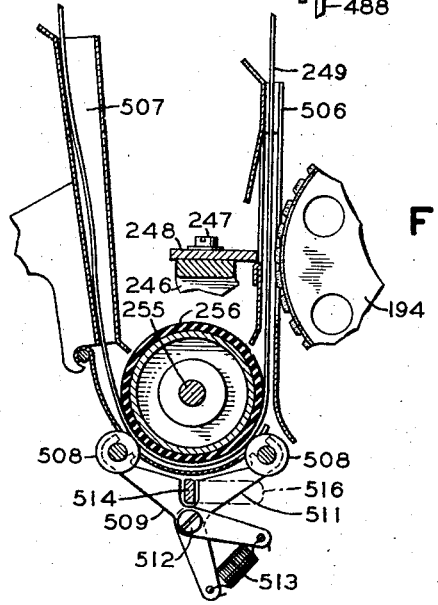

Patented May 8, 1945

2,375,541

UNITED STATES PATENT OFFICE 2,375,541

TELEGRAPH PRINTER

Robert F. Dirkes, Jamaica, N. Y., and James W. Long, Plainfield, and Thomas E. Melick, Neshanic, N. J., and Ernest W. Hewitt, Stamford, Conn., assignors to The Western Union Telegraph Company, New York, N. Y., a corporation of New York Application July 8, 1942, Serial No. 450,144

30 Claims. (Cl. 178—29)

This invention relates primarily to telegraph printers and more particularly to page printers of the type responsive to start-stop signals and employing movable typewheels to record on stationary recording mediums.

As is well-known in the telegraph art, start-stop telegraph receiving equipment is normally cyclically operable through one cycle of operation in response to each received code group of impulses. Each start-stop code group of impulses is composed of a start impulse, which is effective to initiate the receiving instrument into a cycle of operation, followed by a definite number, usually five, intelligence impulses arranged in permutations in accordance with the character to be recorded or the function to be performed, and terminated by a rest impulse which is effective to bring the receiver to rest in its normal rest position. The receiver comprising the present invention is adapted to be controlled by that type of start-stop signals wherein the impulses are closed and open line conditions. However, the polar type start-stop signals could be employed to control the printer with slight modifications thereof.

A single selector magnet is employed to control the printer and is connected in series with the line, it being responsive to all signals received thereover. The start impulse of a code group which is an open line condition in accordance with the usual telegraph practice releases a rotatable member for rotation. During the rotation of the rotatable member it, in conjunction with the selector magnet armature, selectively positions a set of selectors equal in number to the intelligence impulses of each code group, following which the rest impulse, a closed line condition, is effective to stop rotation of the rotatable member. Following the positioning of the selectors, the permuted setting thereof is transferred to a set of code discs embodied in a drum type typewheel shaft stop unit. The code discs are each differently notched around the peripheries thereof and cooperating therewith are selectable stop members, selectable in accordance with the positions of the code discs to stop the typewheel shaft in selected angular positions and/or to control the performance of the printer functions. Following the selective positioning of the typewheel, which is rotatable with the typewheel shaft, a bail is operated to effect printing from the typewheel and concomitantly therewith the typewheel is advanced to effect letter spacing.

At the end of one line of print the typewheel, which is axially movable along the typewheel shaft, is returned to its initial position at the left hand side of the recording medium for the beginning of a new line of print, and concomitantly with the typewheel return function the recording medium normally is advanced.

The above-mentioned general operations of the printer are performed in timed relation to one another, with the timing thereof being effected by rotatable cams rotating in timed relation to the received code groups of impulses.

One of the principal objects of the present invention is to provide a telegraph page printer of improved design embodying subcombinations of mechanisms which are easily detachable from the complete machine and replaceable whereby repairs, replacements, adjustments and maintenance may be quickly and easily effected.

Another object of the invention is to provide a telegraph printer embodying a minimum number of parts and which parts are easy and cheap to manufacture.

Still another object of the present invention is to provide a telegraph printer of the above-mentioned type wherein there is no storage of characters during idle periods of the printer, or in other words, a printer that during a single cycle of operation records the character representing the signals that initiated the printer into the cycle of operation.

Still another object of the invention is to provide function control and operating mechanisms of improved and simplified design.

A more specific object of the invention is to provide a typewheel car arresting arrangement of new and simplified design capable of stopping the rapid return movement of the typewheel noiselessly without bounce and with a minimum of movable parts.

Another more specific object of the invention is to provide an improved typewheel shaft for guiding the typewheel in its to and fro movement.

These and other objects of the invention will be more apparent in the following detailed description of the invention when taken in conjunction with the accompanying drawings, in the latter of which:

Fig. 1 is a front elevational view of the printer together with an associated keyboard, the keyboard being of the type disclosed in a copending application Serial No. 374,824, filed January 17, 1941;

Fig. 2 is a vertical sectional view taken substantially on line 2—2 of Fig. 1, showing principally the typewheel car advancing mechanism;

Fig. 3 is a plan view of the function control mechanisms including the typewheel car advancing and return mechanism;

Fig. 4 is an elevational view taken substantially on line 4—4 of Fig. 2;

Fig. 5 is a vertical sectional view taken substantially on line 5—5 of Fig. 3, showing the automatic typewheel car returning mechanism;

Fig. 6 is a plan view showing some of the elements of Fig. 5 as they appear when taken on line 6—6 of said Fig. 5;

Fig. 7 is a vertical sectional view taken substantially on line 7—7 of Fig. 3, showing the line feed mechanism;

Fig. 8 is an elevational view of some of the elements of Fig. 7 taken substantially on line 8—8 of Fig. 7;

Fig. 9 is a vertical sectional view taken substantially on line 9—9 of Fig. 3;

Fig. 14 is an elevational view of some of the elements on the left hand end of the printer;

Fig. 15 is a plan view of the main operating shaft together with the various elements thereon;

Fig. 16 is a vertical sectional view taken substantially on line 16—16 of Fig. 15;

Fig. 17 is a vertical sectional view taken substantially on line 17—17 of Fig. 15;

Fig. 27 is a vertical sectional view of the elements comprising a modified automatic carriage return and line feed arrangement;

Fig. 28 is a plan view of some of the elements of Fig. 27;

Fig. 29 is a right hand end view of some of the elements of Figs. 27 and 28; and Fig. 30 is a vertical sectional view showing a modified arrangement for feeding the recording paper.

Figure 23:
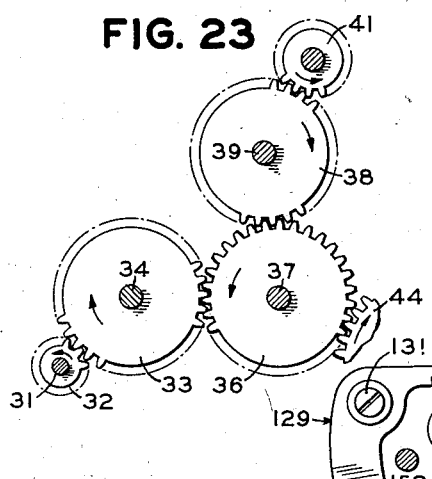
Fig. 23 is a view taken substantially on line 23—23 of Fig. 1, showing the arrangement of the gears employed to drive the various rotatable elements.

Referring first to Fig. 1, an electric motor M is shown which supplies power for performing the various functions and operations of the printer. The motor M is constantly rotating and has on its shaft 31, Fig. 23, a pinion gear 32. The pinion gear 32 meshes with a gear 33 located on a selector shaft 34 and is adapted to drive the same through a friction clutch of suitable design (not shown). The gear 33 in turn meshes with a gear 36 fixed by means of a hub 35 and screw 35', Fig. 15, to an operating shaft 37 to constantly rotate the same. The gear 36 meshes with an idler gear 38, Fig. 23, pivotally supported on a stud 39, which in turn meshes with and drives a gear 41. The gear 41 through a friction clutch, indicated generally by reference numeral 42, Fig. 12, drives a typewheel shaft 43. Also meshing with the gear 36, Fig. 23, is a gear 44 which may be adapted to drive the keyboard transmitting mechanism, such as that disclosed in a copending application of V. R. Kimball et al., Serial No. 374,824, filed January 17, 1941, now Patent No. 2,284,322.

From the above described arrangement of the gears in the printer it will be noted that all of the gears, including the gear for driving the keyboard mechanism that may be associated with the printer, are located in but one plane. Accordingly, all of the gears may be of simple and cheap design, such as helical gears. With this arrangement of the gears only a minimum number is required, and the lining up of the various gears is relatively simple. Such an arrangement also permits all of the shafts in the printer to be parallel with one another, thus requiring fewer operations when forming the supports or bearings in the frame castings for the shafts.

The main structural elements of the printer including those of the keyboard mechanism comprise only three elements: the main base 46, Fig. 1, which also serves as the main structural part of the keyboard mechanism, a left hand frame member 47 attached to the base 46, and a right hand frame member 48 also attached to the base 46. The keyboard mechanism includes a set of keylevers 49 and a transmitting shaft 51 adapted to be frictionally driven from the gear 44 through a friction clutch 52. The transmitting mechanism also includes a face plate 53 and associated brush 54 adapted to transmit to a line circuit and/or the selector magnet of the associated printing mechanism code combinations of impulses representative of the actuated ones of the keylevers 49. A complete description of the keyboard mechanism is given in the above-mentioned copending Kimball et al. application, and reference may be made to the same for a complete description of the keyboard.

The selector mechanism of the present printer is substantially similar in operation and construction to the selector mechanism disclosed in a copending application of R. F. Dirkes et al., Serial No. 318,021, filed February 9, 1940. The selector mechanism includes a selector magnet 56, Fig. 19, which has an associated armature 57 carried on the left hand end of an armature lever 58 pivotally mounted adjacent its center on a horizontal stud 59. A retractile spring 61 is attached to the armature lever 58 and moves the same in a counterclockwise direction to its retracted position on deenergization of the selector magnet 56. The selector magnet 56 is suitably supported from the frame structure along with the stud 59, while the spring 61 is anchored in the end of an adjustable screw 62 supported from the frame structure.

A bracket 63 attached to the frame structure has in the lower end thereof a shoulder screw 64, upon which is mounted a bell crank 66. The bell crank has a horizontally extending arm 67 which extends beneath the right hand end, as shown in Fig. 22, of the armature lever 58. A depending arm 68 of the bell crank 66 has the lower end thereof substantially opposite the outer end of the selector shaft 34, best shown in Fig. 21. The bell crank 66 serves to initiate the rotation of the selector shaft 34 in a manner hereinafter pointed out.

Figure 21:
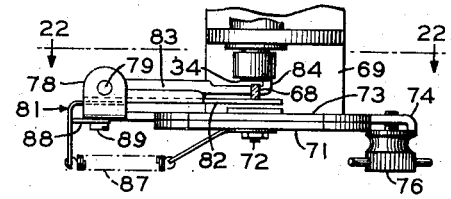
Fig. 21 is a plan view of the orienting mechanism.
Figure 22:
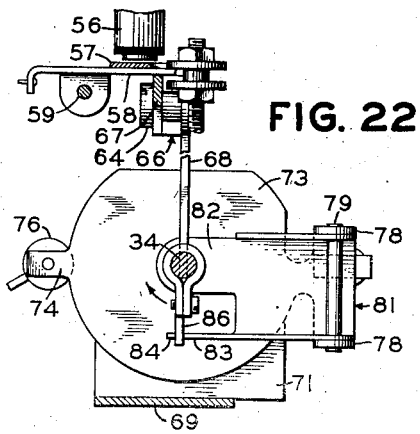
Fig. 22 is a sectional view taken substantially on line 22—22 of Fig. 21.
Figure 20:
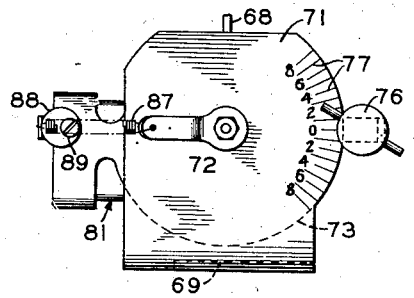
Fig. 20 is an elevational view of the orienting mechanism.

Suitably supported from the frame structure is a bracket 69, Figs. 20 to 22, which has a vertical section 71 disposed opposite the outer end of the selector shaft 34. Extending through approximately the center of the section 71 of the bracket 69 is a shoulder screw 72, upon which is pivotally mounted a plate member 73. The plate member 73 has a projection 74, into which is threaded a thumb screw 76. By loosening the thumb screw 76 the plate 73 may be rotated about the shoulder screw 72 to effect orientation of the printer in a manner hereinafter described. Tightening the thumb screw 76 locks the plate 73 in position. Indications, such as 77, cooperating with the thumb screw 76 assist in determining the adjusted position thereof and in taking a "range" on the printer.

The left hand side of the movable plate 73, as shown in Fig. 21, and the right hand side, as shown in Fig. 22, have projections 78 which support a rod 79. Pivotally mounted on the rod 79 is a stop lever 81 which has two projecting arms 82 and 83. The free end of the arm 82 is positioned opposite the lower end of the arm 68 of the bell crank 66 and the outer end of the selector shaft 34. The arm 83 of the stop lever 81 has a projection 84 at the end thereof in the form of a hook which cooperates with a stop arm 86 clamped to the outer end of the selector shaft 34. Engagement of the stop arm 86 with the hooked portion 84 of the arm 83 holds the frictionally driven stop arm and selector shaft 34 at rest in their normal positions. A spring 87 attached to the stop lever 81 tends to pivot the same in a counterclockwise direction, as shown in Fig. 21, to keep the hooked portion 84 in the path of the stop arm. A small eccentric plate 88 secured by a screw 89 to the leftwardly extending part of the plate 73, Figs. 20 and 21, determines the retracted position of the stop lever 81.

From the arrangement of the above-described elements it will be apparent that, when the movable plate 73 is rotated about the shoulder screw 72 concentrically with the selector shaft 34, the stop position of the selector shaft is varied. By thus changing the stop position of the selector shaft 34, the amount of rotation thereof from its stop position to enable the selector cams hereinafter described rotating therewith to become effective on associated latches may be varied. Thus, the orienting mechanism shown in Figs. 20 to 22 permits the selector shaft to be oriented and enables the cams thereon to be associated with their associated elements during the midportion or most effective portion of their respective signal impulses.

The release of the selector shaft 34 at the beginning of each code group of impulses is effected in response to the start impulse preceding each group. The normal condition of the selector magnet 56 is energized, and the open line start impulse permits the spring 61, Fig. 19, to pivot the armature lever 58 in a counterclockwise direction. This pivoting of the lever 58 also causes the bell crank 66, Figs. 19 and 22, to pivot so that the depending arm 68 thereof engaging the arm 82 of the stop lever 81 pivots the stop lever in a clockwise direction, as shown in Fig. 21, to move the hook 84 on the arm 83 out of engagement with the stop arm 86. Thereupon the stop arm 86 and the selector shaft are free to rotate through power communicated thereto through a friction clutch (not shown). Near the end of a revolution of the selector shaft 34, the closed line rest or stop impulse will be effective on the selector magnet 56 to cause the armature lever 58 to pivot back to its normal position. With the armature lever 58 in its normal position, the bell crank 66 permits the spring 87 to pivot the stop lever 81 to its normal position which places the hook 84 in the path of the stop arm 86, where it engages and stops rotation of the stop arm and selector shaft in their normal rest positions at the end of each revolution. Thus, the selector shaft 34 is initiated into rotation and brought to rest after each revolution in conjunction with each received code group of impulses.

Figure 19:
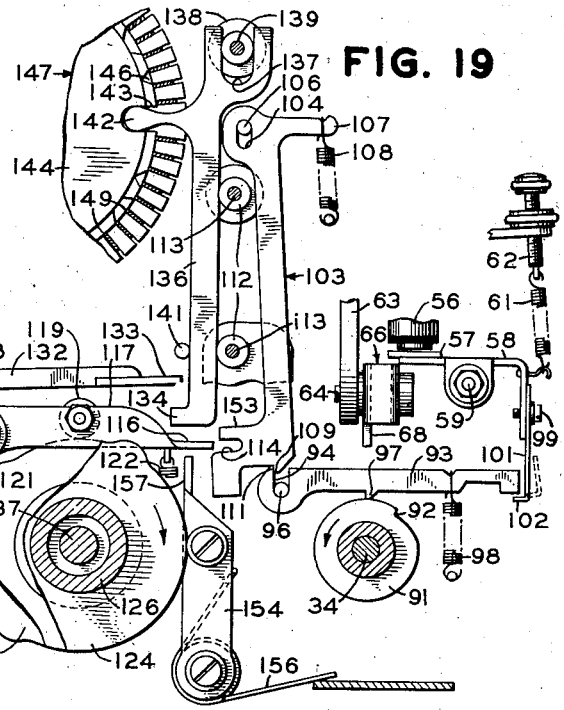
Fig. 19 is a vertical sectional view taken substantially on line 19—19 of Fig. 1, showing principally the selector mechanism.

Fixed to the selector shaft 34, Fig. 19, for rotation therewith are a series of five selector cams 91, each of which has a notch 92 therein. The cams 91 are arranged so that the notches 92 are in a spiral progression, and each selector cam 91 has associated therewith a selector latch 93 which, as shown in Fig. 19, is disposed in a substantially horizontal position. There are five selector latches 93, one for each selector cam 91 and each variable impulse of the signaling code group, and as all the latches operate in exactly the same manner, the operation of only one selector latch with its associated elements will be described. Each selector latch 93 has a vertical bifurcation 94 adjacent its left hand end which engages a horizontal pin 96. Adjacent the center of the latch 93 is a projection 97 in operative relation with the periphery of its associated cam 91. A spring 98 attached to the latch 93 to the right of the projection 97 holds the same in engagement with the periphery of its associated cam and the pin 96 in engagement with the bottom of the bifurcation 94. Secured by screws such as 99 to the depending part of the armature lever 58 is a baffle member 101 which has a horizontally extending projection 102 at the lower end thereof. With the armature lever in its energized position, the horizontal section 102 of the baffle member is beneath the right hand end of the selector lever 93, as shown by the full outline thereof, whereas with the armature lever in its retracted position, the horizontal section 102 is a slight distance to the right of the right hand end of the selector latch, as shown by the dot-dashed outline thereof.

The baffle member 102 is positioned into either one of its two positions in accordance with the received signaling impulses, and the selector shaft 34 rotates in timed relation to the received impulses so that the notches 92 in the cams 91 are operatively associated with the projections 97 on the selector latches 93 during the receipt of associated impulses. With the horizontal section 102 of the baffle member out from beneath the right hand end of the selector latch 93, the attached spring 98 pivots the latch in a clockwise direction, with the pin 96 at the left hand end serving as a pivot point when the notch 92 in the associated cam rotates into operative relation with the projection 97. With the horizontal section 102 beneath the right hand end of the selector latch 93 when the notch 92 rotates into operative relation with the projection 97, only a slight amount of pivoting of the latch 93 about the pin 96 is permitted before the right hand end is blocked by the horizontal section 102. When the right hand end of the selector latch 93 is thus blocked, the projection 97 will not have reached the bottom of the notch 92, and the spring 98, still exerting a force thereon, causes the selector latch to pivot about the right hand end in contact with the horizontal section 102. This pivoting of the latch 93 is in a counterclockwise direction, and during such pivoting the bifurcation 94 in the left hand end slides on the pin 96. Thus, depending upon the character of the signaling impulse at the time the notch 92 in a selector cam rotates into operative relation with the projection 97 on a latch 93, the latch is pivoted either about its left or its right hand end. The manner in which the selector latches 93 in pivoting about either one or the other of their two ends control associated selectors such as 103 will be hereinafter described.

The selectors 103 are disposed in a substantially vertical position and have adjacent their upper ends vertical slots 104 which engage a horizontal pin 106. The selectors 103 have rightwardly extending arms 107 to which are attached springs 108. The springs 108 tend to pivot the selectors in a clockwise direction and hold latching projections 109 at the lower ends thereof in engagement with other latching projections 111 on associated selector latches 93. The springs 108 also hold the selectors 103 so the the pin 106 engages the upper ends of the slots 104.

When a selector latch 93 pivots about its left hand end, the latching projection 111 thereon remains engaged with the latching projection 109 on its associated selector 103. Thus, the position of the selector remains unchanged. However, when a selector latch 93 pivots about its right hand end, the latching projection 111 thereon is moved down and out of engagement with the latching projection 109 on the associated selector. On disengagement of the latching projections 111 and 109, the spring 108 attached to the selector is effective to pivot the same a slight amount in a clockwise direction about the pin 106 as limited by a spacer such as 112 on a fixed pin 113. Such a position of a selector 103 is its selected position, whereas its normal position is that shown in Fig. 19. Thus, the selectors 103 assume a setting in one or the other of their two positions, either normal unselected latched or selected unlatched positions, in accordance with the received impulses.

Adjacent the lower ends of the selectors 103 are horizontal bifurcations 114 opening toward the left. With a selector in its normal latched position, the bifurcation is to the right and out of operative relation with the free end section 116 of a transfer bail 117, whereas in a selected position the bifurcation 114 straddles the end 116 of the bail 117. The transfer bail 117 is pivoted on a shoulder screw 118 at its left hand end and has adjacent the center a cam follower 119 in operative relation with the periphery of a transfer cam 121. A spring 122 attached to the bail 117 keeps the cam follower 119 in engagement with the transfer cam 121.

The transfer cam 121 together with a transfer bar resetting cam 123 and a selector lever resetting cam 124 are mounted on a sleeve 126 for rotation therewith. The sleeve 126 is driven from the constantly rotating operating shaft 37 through a clutch hereinafter described. The transfer bar reset cam 123 has in operative relation with the periphery thereof a cam follower 127 mounted on the depending arm 128 of a bell crank 129, which in turn is pivotally supported at 131. The rightwardly extending arm 132 of the bell crank 129 has a section 133 thereon in operative relation with leftwardly extending projections 134 at the lower ends of vertically disposed transfer bars 136. The transfer bars 136 are guided for longitudinal movement by bifurcations 137 in the upper ends thereof engaging spacers 138 on a stud 139. The lower ends of the transfer bars 136 are guided by a horizontal pin 141 and the spacers 112 on the pin 113.

There are five transfer bars 136, one individual to each selector lever 103, and they have at their upper ends leftwardly extending round-ended arms 142. The arms 142 engage slots 143 in associated code discs 144. The code discs 144 are each differentially notched around the periphery thereof with sloping sided notches such as 146. The code discs 144 are included in the type-wheel stop unit, indicated in general by reference numeral 147, Figs. 1, 3 and 12, and are mounted for limited pivotal movement on a sleeve member 148. Arranged around the periphery of the code discs 144 are a series of individual stop elements 149 which are urged towards the center of the discs by individual springs 151. When the discs 144 are selectively set, a notch in each one is in alignment with a notch in each of the others and permits the stop element 149 opposite or in operative relation with the aligned row of notches to move towards the center of the discs. Thus, any one of the stop elements 149 of the stop unit is selected by properly setting the code discs 144, and the manner in which code discs are selectively set in accordance with the operation of the selectors 103, Fig. 19, will be set forth in the following paragraphs.

After the release of the sleeve 126 carrying the transfer cam 121, the transfer bar reset cam 123 and the selector lever reset cam 124, the sleeve being released for one revolution in conjunction with each cycle of operation of the printer, the first operation is the pivoting of the bell crank 129 in a clockwise direction. This pivoting of the bell crank 129 is against the retractive force of a spring 152 attached thereto, and during such movement the section 133 thereof engages the leftwardly extending projections 134 of the transfer bars 136 that happen to be in an elevated position, depending upon the preceding code combination, and returns these elevated transfer bars to their unselected lower position. This movement of the transfer bars 136 rotates associated code discs 144 to their unselected position, and during such movement the V-shaped notches 146 in the code discs 144 cam the previously selected stop member 149 out of its selected position to release the typewheel shaft 43 in a manner hereinafter pointed out. Thus, the code discs 144 and transfer bars 136 are returned to their unselected positions at the beginning of a cycle of operation of the cams carried on the sleeve 126 and are ready to have the selected setting of the selector levers 103 transferred thereto.

The transfer operation is performed by the transfer cam 121 which pivots the transfer bail 117 in a counterclockwise direction so that the selected or unlatched ones of the selector levers 103 or those with the bifurcations 114 therein, straddling the section 116 of the transfer bail, move upward with the bail 117. As these selector levers move in an upward direction, the surfaces 153 thereon engage the lower ends of associated transfer bars 136 to move the same upward therewith. The upward movement of the transfer bars 136 rotates associated ones of the code discs 144 to align a row of notches 146 therein to effect the selection of the stop members 149 corresponding to the received code group of impulses. Thus, a stop member 149 representative of a received code group of impulses is selected, and the selected stop element is effective to stop the typewheel with the representative character thereon in printing position.

Following the transfer of the selection set up in the selector levers 103 to the transfer bars 136, the unlatched ones of the selectors are returned to their normal latched position by the pivoting of the selector lever reset bail 154 in a clockwise direction against the action of a return spring 156 by the cam 124 cooperating with the cam follower 155 on the bail. The pivoting of the selector lever reset bail 154 causes the section 157 at the upper end thereof to engage the lower ends of the unlatched ones of the selector levers 102 and move the same to the right, whereupon the latching projections 109 thereon are in operative relation with latching projections 111 on associated selector latches 93. In the preferred embodiment of the invention the movement of the lower ends of the unlatched ones of the selector levers 103 to the right occurs just after the transfer operation, or while these selector levers 103 are in an elevated position as moved by the transfer bail 117. The subsequent return of the transfer bail 117 to its normal position just prior to the return of the selector lever reset bail 154 to its normal position permits the latching surfaces 109 and 111 on the selector levers 103 and latches 93, respectively, to engage without any camming action or disturbance of the latches 93. Thus, no time is required for the selector latches 93 to settle down before they can be again operated in response to a succeeding code group of impulses.

Figure 18:
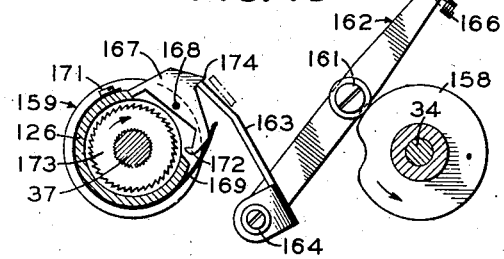
Fig. 18 is a vertical sectional view taken substantially on line 18—18 of Fig. 15.

Rotatable with the selector cams 91 on the selector shaft 34 is a notched operating sleeve trip cam 158, Fig. 18, adapted to trip a clutch indicated in general by reference numeral 159 on the operating shaft 37 to effect release of the sleeve 126 and the cams 121, 123 and 124 thereon for rotation with the shaft 37. In operative relation with the cam 158 is a cam follower 161 adjacent the center of a lever 162. The lever 162 together with a second lever 163 make up a bell crank which is pivoted on a shoulder screw 164. A spring 166 attached to the lever 162 tends to pivot the bell crank composed of the levers 162 and 163 in a clockwise direction and holds the cam follower 161 in engagement with the periphery of the cam 158.

The clutch 159 includes a dog 167 pivotally mounted on a pin 168 in the left hand end of the sleeve 126, as shown in Fig. 15. A flat leaf spring 169 secured to the sleeve by a screw 171, Fig. 18, tends to pivot the dog 167 to effect engagement of a hooked portion 172 thereof with teeth on a ratchet wheel 173 fixed to and rotating with the continuously rotating operating shaft 37. The end of the arm 163 normally engages a surface 174 of the dog 167 to hold the hooked portion 172 out of engagement with the teeth on the ratchet 173. When the notch in the cam 158 permits the spring 166 to pivot the bell crank composed of the levers 162 and 163 in a clockwise direction, the end of the arm 163 is moved out of engagement with the surface 174 of the dog 167. This operation preferably occurs near the end of a revolution of the selector shaft 34 so as to assure the positioning of the selector levers 103 before the cams on the sleeve 126 operate their associated bails. The release of the dog 167 by the end of the lever 163 permits the hooked portion 172 to engage the teeth of the ratchet 173, whereupon the sleeve 126 and the attached cams rotate with the shaft 37. Before the sleeve 126 has completed a revolution, the lever 163 will be returned to its normal position where its free end is in the path of the surface 174 to effect disengagement of the hooked portion 172 of the dog from the teeth of the ratchet 173 after one revolution of the sleeve 126. Thus, the sleeve 126 is released and brought to rest in its normal rest position in conjunction with each revolution of the selector shaft 34. During rotation of the sleeve 126 the various cams thereon perform their related functions in the manner set forth above and are effective to cause the selection of one of the stop members 149, Fig. 12, in the stop unit 147.

Figure 12:
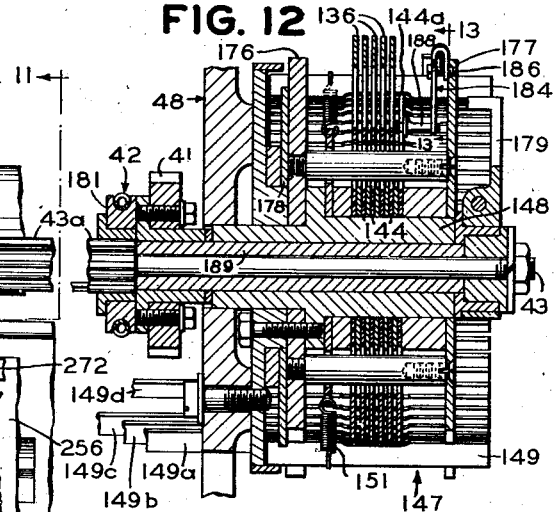
Fig. 12 is a horizontal sectional view through the center of the typewheel stop unit.

In addition to the stop members 149 and code discs 144, the stop unit 147 includes two circular guide plates 176 and 177, Fig. 12, which have radial slots therein to guide the stop members 149 in their movement. The guide discs 176 and 177 are located adjacent the ends of the stop members and a circular pivot plate 178 to the left of the guide plate 176 serves as a pivot for the left hand ends of the stop members as the right hand ends move toward the center of the discs by the attached springs 151 when a row of aligned notches exists in the code discs 144.

The right hand end of the typewheel shaft 43 extends through the stop unit 147 and has fixed thereto for rotation therewith a stop arm 179. The typewheel shaft, as hereinbefore described, is frictionally driven through a friction clutch 42 including friction segments 181 from the continuously rotating gear 41. The right hand ends of the stop members 149 extend a slight distance beyond the right hand guide plate 177 and in their normal unselected position are out of the path of the end of the stop arm 179. The movement of the right hand end of the stop member 149 toward the center of the stop unit 147 to a selected position places the end in the path of the stop arm and, as the stop arm rotates, it engages the selected stop member to stop the typewheel shaft 43 in a selected angular position. The return of the code discs 144 to their normal unselected position prior to the transfer of another setting of the selectors thereto cams the selected stop member 149 back into its normal position by means of the sloping surfaces of the notches in the code discs and releases the stop arm 179 and typewheel shaft for rotation through the action of the friction clutch 42. The setting of the code discs 144 in a new combination selects another stop member 149 which is effective to stop the typewheel shaft 43 in another selected angular position.

Figure 13:
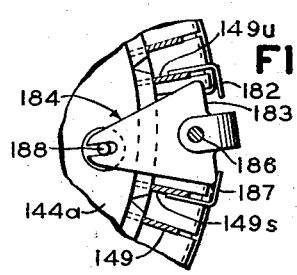
Fig. 13 is a detail view taken substantially on line 13—13 of Fig. 12.

With five variable signaling impulses twirty-two combinations are possible, and in order to increase the number of stop members selectable, case shift signal groups called shift and unshift combinations are employed. In response to one of the shift signals such as the unshift combination the code discs 144 are so positioned as to select the stop member 149u, Fig. 13. On receipt of the other shift signal a stop member 149s is selected. Extending from the stop member 149u is an operating projection 182 which cooperates with the surface 183 of a triangularly shaped member 184 to pivot the same in a counterclockwise direction about a shoulder screw 186. A similar projection 187 on the stop member 149s is effective to pivot the triangular member 184 in a clockwise direction on the selection of this stop member. The left hand end of the triangular member 184 is bifurcated, and the bifurcation engages a pin 188 extending from a shift disc 144a positioned alongside the other code discs 144 on the sleeve 148. The shift disc 144a is movable on the sleeve 148, as are the code discs 144, and movement thereof from one position to the other is effected by the selection of the stop members 149u and 149s. The shift disc 144a has notches arranged around the periphery thereof, and in one position one group of stop members is selectable in response to certain code combinations, whereas with the shift disc 144a in its other position a different group of stop members 149 is selectable in response to the same code combinations. Thus, the shift disc 144a substantially doubles the number of stop members 149 in the stop unit 147 that may be selected.

The typewheel shaft 43, which is stopped in any one of a number of selected angular positions by the selective operation of one of the stop members 149, is journaled adjacent its right hand end, as shown in Fig. 12, in a sleeve bearing 189 carried inside the sleeve 148 of the stop unit 147. The opposite end of the typewheel shaft is journaled in a bushing 191 supported in the frame section 47. While the ends of the typewheel shaft 43 in associated bearings are circular in cross-section, the portion of the shaft extending between the bushing 191 and the friction clutch 42 is splined and, in the preferred embodiment, is in the form of a pinion rod, as best shown in Fig. 11, this section of the shaft being designated by reference numeral 43a. Adapted to rotate with the typewheel shaft 43 while at the same time being slidable along the section 43a is a flanged hub 192, Figs. 10 and 11, to which is secured by screws such as 193 a typewheel 194 having a single row of type elements around the periphery thereof. The hole through the center of the hub 192 is shaped so as to engage the splines or teeth of the section 43a of the typewheel shaft, and this permits the hub to slide freely on the section 43a without having excessive lost rotative motion between the two elements. The arrangement of having a comparatively large number of teeth or guiding surfaces on the section such as 43a of the typewheel shaft along which the typewheel moves also has the advantage that at least one engaging surface between the two elements is perpendicular to, or substantially so, to the direction that the printing force is applied to the typewheel by the printing bail. This eliminates any tendency the printing bail has to wedge or bind the typewheel hub to the shaft on the printing stroke, while at the same time permitting the typewheel to slide freely along the shaft with a minimum of lost rotative motion between the two elements.

Extending between the upright sections 47 and 48 of the frame structure and parallel to the typewheel shaft 43 is a typewheel car guide rod, upon which is slidably mounted the typewheel car, indicated in general by reference numeral 197. The guide rod 196 is located below the typewheel shaft 43, and extending upwardly from the typewheel car 197 is a bifurcated arm 198 adapted to engage a groove 199 in the typewheel hub 192 so that the typewheel 194 moves back and forth with the typewheel car. Pivotally mounted on a pin 200 in the typewheel car 197 are levers such as 201 and 202 which pivotally carry adjacent the free ends thereof an intermediate ink roller 203 and a saturated ink supplying roller 204, respectively. A spring 206 attached to the lever 202 keeps the rollers 204 and 203 in engagement with one another, and the roller 203 also in engagement with the periphery of the typewheel 194. The ink rollers 203 and 204 keep the type elements on the periphery of the typewheel 194 supplied with ink, the type elements being preferably of rubber or other suitable material. Extending from the right hand side of the typewheel car 197, as shown in Fig. 11, is a pin 207 and a shoulder screw 208, upon the latter of which is mounted a roller 209. The pin 207 and the roller 209 are located on opposite sides of a rod 211 extending parallel to the typewheel shaft, and the rod assists in guiding the typewheel car 197 in its to and fro movement, as will hereinafter be described.

After the positioning of the typewheel in a selected angular position corresponding to the received code group of impules, the next operation is the printing operation, and this is performed by a print cam 212, Figs. 15 and 16. The print cam 212 along with a typewheel car advancing or letter spacing cam 213 and a line feed cam 214 are carried for rotation therewith on a secondary sleeve 216. The sleeve 216 is located on the left hand section of the operating shaft 37 between the frame section 48 and a vertical mounting plate 217 forming part of the frame structure. The sleeve 216 is driven from the shaft 37 by a clutch 218, which may be and in the preferred embodiment is similar in construction and operation to the clutch 159 employed to drive the first or primary operating sleeve 126. The clutch 218 includes a dog 219, Fig. 17, and an operating trip arm 221. The trip arm 221 is clamped by a screw 222 to a rock shaft 223. The rock shaft 223 is supported in sections 224 and 226 of the frame structure and has adjacent the right hand end, as shown in Fig. 15, a lever 227. The lever 227 is clamped to the rod 223 by a set screw 228 so that the lever and rod pivot together. At the free end of the lever 227 is a roller cam follower 229 in operative relation with the periphery of a trip cam 231 clamped for rotation therewith to the first operating sleeve 126. A spring 232 attached to the lever 227 keeps the roller 229 in engagement with the periphery of cam 231, and following a predetermined amount of rotation of the primary sleeve 126 from its rest position a notch or drop 233 in the cam 231 permits the spring 232 to rock the rod 223 in a clockwise direction, as shown in Fig. 17. This rocking of the rod 223 withdraws the trip lever 221 from engagement with the dog 219 of the clutch 218, this initiating the rotation of the sleeve 216 and the cams thereon with the constantly rotating shaft 37. A spring biased lever 234 pivoted at 236 is so arranged that the free end thereof cooperates with the notch 233 in the cam 231 to prevent rotation of the sleeve 126 in a reverse direction when the same is stopped in its normal rest position.

Following a revolution of the secondary sleeve 216, the trip lever 221 is effective to disengage the clutch 218 and stop the said sleeve in its normal rest position. A spring biased lever 237, Fig. 16, is pivoted at 238 and cooperates with a notch in a cam 239 rotatable with the secondary sleeve 216 in the normal stop position of the latter to prevent rotation in a reverse direction of the sleeve when the same is brought to a sudden stop by the trip lever 216.

In operative relation with the periphery of the print cam 212 is a roller cam follower 241 carried in the lower end of a lever 242, which is clamped by a screw 243 in the upper end thereof to the rod 211, which extends parallel to the typewheel shaft 43. Also clamped to the rod 211 by screws such as 244 and extending upwardly therefrom is a U-shaped bail member 246, which has attached to the upper cross-section part thereof by screws 247 a print hammer or bail 248. The print hammer 248 is in horizontal alignment with the typewheel shaft 43, and its length is substantially equal to or slightly greater than that of the typewheel car travel along the section 43a of the typewheel shaft. The recording paper 249, Figs. 11 and 16, passes between the typewheel 194 and the print hammer 248, and the operation of the print hammer presses the paper against the typewheel to effect recording thereon of the character on the typewheel opposite the print hammer. The recording paper 249 is supplied from a bobbin 251, and as the paper travels from the bobbin to the typewheel 197 it encounters a rod 252, paper guide elements 253 and 254 and then a feed wheel or roller 256. The feed roller is fixed for rotation therewith to a shaft 255, and a member 257 resiliently holds the paper 259 against the feed roller 256, which may have a rubber sleeve, so that, as the latter is rotated in a manner hereinafter pointed out, the recording paper will be advanced. The recording operation which is performed when the print hammer 248 presses the recording paper against the inked characters on the typewheel 194 is timed by the print cam 212. The actual printing movement of the print hammer 248 is effected by a spring 258, Fig. 14, which is attached to the free end of an arm 259 secured by a screw 261 to the outer left hand end of the rod 211. The notch 260 in the print cam 212, Fig. 16, rotating into operative relation with the cam follower 241, allows the spring 258 to rock the rod 211 in a counterclockwise direction, as viewed in Fig. 16, and move the print hammer 248 and recording paper 249 against the selected character on the typewheel 194 to effect a printing operation. As the notch of the print cam 212 rotates out of operation with the roller 241, the print hammer is rocked back to its normal position. A shield or guide 262, Fig. 11, is attached to the typewheel car 197 and guides the paper adjacent the typewheel 194 so as to prevent smudging thereof as the typewheel rotates and moves longitudinally and permits contact between the paper and typewheel only by movement of the print hammer 248 and only one character at a time.

In addition to the printing function in the printer, there are three other main functions; the line feed function, the typewheel car return function, and the letter or word spacing or typewheel car advancing function. The printing mechanism including the print hammer 248 is invariably operated for each cycle of operation of the printer, whereas the other functions are selectively performed in response to predetermined signal groups. During the performance of some of the functions other than the printing function it is desirable to prevent printing on the recording paper, and this is accomplished by so positioning the typewheel that a blank space thereon is opposite the print ball during a cycle of operation in which other of the functions are performed. Some of the printer functions, such as the typewheel car return and the line feed, are usually performed together in response to a typewheel car return signal. However, it may be desirable to perform a line feed operation without the typewheel car return function, and in response to a line feed signal only a line feed operation is performed, whereas in response to the typewheel car return signal both the typewheel car return function and the line feed operation are performed.

Following a printing operation the typewheel car has to be advanced in a letter spacing direction to present a clean surface on the recording paper to the typewheel for the next recording operation or for a word space, and the elements of the printer and the operation thereof whereby the word spacing of the typewheel car is accomplished will now be described.

Figure 10:
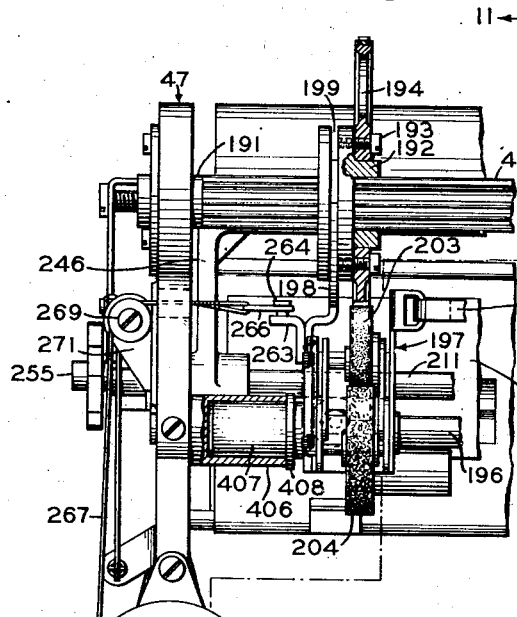
Fig. 10 is an enlarged elevational view of a part of the left hand end of the printer.
Figure 11:
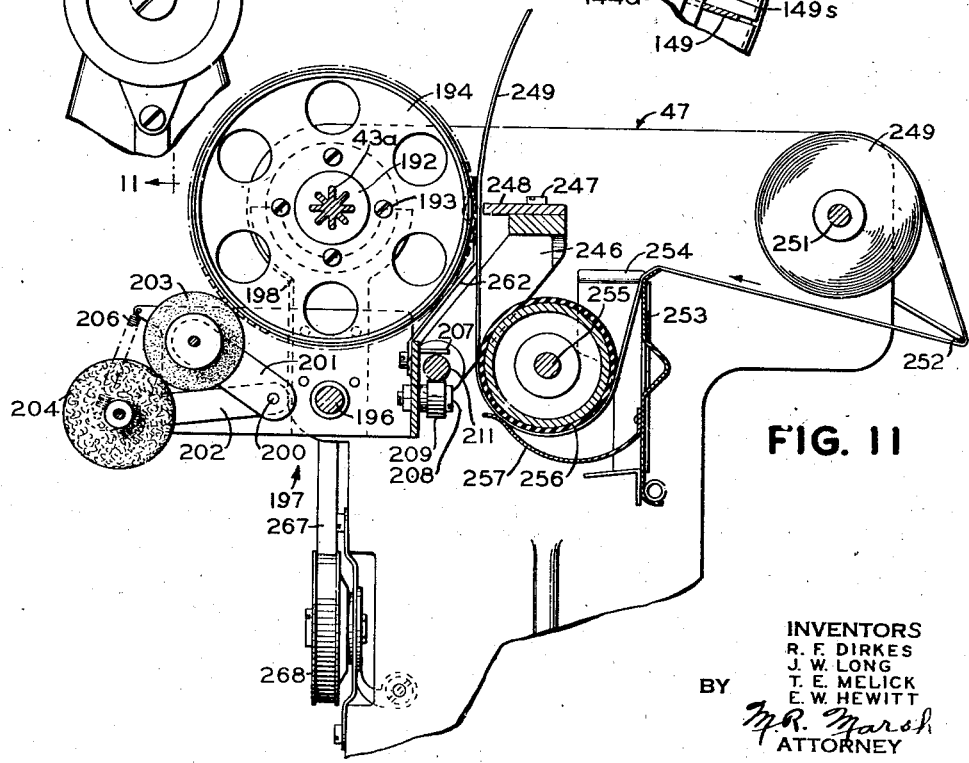
Fig. 11 is a vertical sectional view taken substantially on line 11—11 of Fig. 10, showing principally the typewheel car supporting and guiding elements.

Referring to Fig. 10, the typewheel car 197 has attached to a leftwardly projecting arm 263 thereof by means of a pin 264 and hook 266 a flexible band 267. The other end of the flexible band is attached to a spring drum 268 which tends to wind the band 267 therebout and accordingly resiliently biases the typewheel car 197 to its left hand position. The flexible band 267 passes over a roller 269 pivotally carried in a bracket 271 secured to the left hand frame portion 47 of the printer. The spring drum 268 is effective to return the typewheel car 197 to its left hand position for the beginning of a new line of print whenever the typewheel car advancing mechanism hereinafter described is released. The advancement of the typewheel car 197 from its left hand position to the right is accomplished by power supplied from the motor, and the car is stepped along concomitantly with each printing or word space signal.

Secured to the right hand side of the typewheel car 197 is a second flexible band 272 which, as shown in Fig. 3, passes part way around a roller 273 and then to the left, where it is secured to the periphery of a drum 274. The drum 274 together with a toothed ratchet wheel 276, Figs. 2, 3 and 9, are secured for rotation therewith to a sleeve 277. The sleeve 277 is pivotally supported on a stud 278 extending vertically from the portion 279 of the frame structure. The rotation of the ratchet 276 and drum 274 in a clockwise direction, as viewed in Fig. 3, causes the band 272 to be wound about the drum to advance the typewheel car against the action of the spring drum 268, Figs. 1 and 10.

Pivotally supported on the stud 278 above the toothed disc 276 is a plate 281, Figs. 2, 3 and 9, which pivotally carries on a shoulder screw 282 therein an operating pawl 283. The pawl 283 has an operating portion 284 in operative relation and normally engaged with the periphery of the toothed disc 276. A spring 286 normally biases the pawl 283 to pivot in a clockwise direction, as viewed in Fig. 3, to hold the operating portion in engagement with the teeth on the disc 276.

Also secured to the plate 281 adjacent the free end thereof by means of a shoulder screw 287 is the left hand end of a connecting link 288. The right hand end of the link 288 is pivotally attached by means of a pin 289 to the upper end of a substantially vertically disposed so-called floating lever 291. A spring 292 attached to the link 288 and anchored in a bracket 293 normally holds the upper end of the floating lever 291 against the bracket 293 and the link 288 in its normal retracted position. The lower end of the floating lever 291 is pivotally attached by a pin 294 to the left hand end of a typewheel car feed sliding lever 296 which, along with other sliding levers hereinafter described, is supported on two horizontal studs 297. Slots such as 298 in the sliding lever 296 permit horizontal movement thereof. The sliding lever is normally held in its extreme right hand position against a stop 299, which may have a cushion of resilient material 301 thereon, by means of a retractile spring 302 attached to the floating lever 291 and anchored in a bracket 303.

A vertical slot 304 is formed in the floating lever 291 adjacent the center thereof and extending through the slot is a shoulder screw 306 carried in the upper end of an operating lever 307. The operating lever 307 is pivotally mounted at its lower end on a shaft or rod 308 carried in a bracket 309 secured by screws 311 to the frame section 312. Adjacent the center of the operating lever 307 is a shoulder screw 313 which pivotally carries thereon a roller cam follower 314 in operative relation with the periphery of the letter spacing or typewheel car feed cam 213 mounted on the sleeve 216 on the shaft 37, as previously described.

The cam sleeve 216 makes a single revolution in conjunction with each cycle of operation of the printer and during each revolution of the cam sleeve the projection on the cam 213 engages the cam follower 314 to cause the operating lever 307 to pivot in a counterclockwise direction. This pivoting of the operating lever 307 is transferred to the floating lever 291, and unless the attached sliding lever 216 is locked, the floating lever will pivot in a clockwise direction about the pin 289 in the upper end thereof, as the spring 292 tending to pivot the floating lever in a clockwise direction about the center has a greater effect thereon than the spring 302 tending to pivot the floating lever in a counterclockwise direction. Hence, unless the sliding lever is locked, the spring 302 will stretch and the floating lever 291 pivot about its upper end. This pivoting of the floating lever 291 causes the attached typewheel car feed sliding lever 296 to slide to the left on the studs 297, and during this idle pivoting of the floating lever about its upper end, the link 288 has no appreciable movement, and accordingly the plate 281 carrying the operating pawl 283 is not moved and the toothed disc 276 will not be advanced. Accordingly, for an operation wherein the sliding bar 296 is not locked, no typewheel car advancing operation occurs.

During cycles of operation wherein it is desired to advance the typewheel car, such cycles being those of normal operation wherein a character is printed, or those wherein word spacing is effected, the sliding lever 296 is locked. The locking of the sliding lever 296 is effected by a locking bail 316, Fig. 2, engaging a notch 317 in the upper left hand side of the lever 296. The locking bail 316 is formed on a leftwardly extending arm 318 of a locking member 319. The locking member 319 is pivoted on the right hand stud 297 and has an upwardly extending arm 321 which has a bent portion 322, Fig. 4, carrying adjustable screws 323, 324 and 326. A spring 327 anchored in the bracket 303 is attached to the bent portion 322 of the locking member 319 and tends to pivot the locking member in a counterclockwise direction.

The pivoting of the locking member 319 is controlled by three stop members 149a, 149b and 149c of the stop unit 147. These stop members are considerably longer than the regular stop members 149 in the stop unit 147 and extend a sufficient distance to the left of the stop unit, as shown in Figs. 1, 3 and 4, to be in operative relation with the screws 323, 324 and 326 carried by the locking member 319. The stop members 149a, 149b and 149c have bent portions such as 327 thereon, Fig. 2, which cooperate with the inner ends of the screws 323, 324 and 326. As hereinbefore described in connection with the description of the stop unit 147, Fig. 12, the stop members are pivotally mounted on a pivot plate 178, Fig. 12, and the alignment of a row of notches in the code discs 144 permits the right hand end of a stop member to move toward the center of the unit. The selection and inward movement of the end of one of the stop members 149a, 149b and 149c in operative relation with the stop arm 179 causes its extended end carrying an angle portion 327 to move to the right, as shown in Fig. 2. This movement is transferred to the locking member 319 and causes the same to pivot in a clockwise direction to withdraw the locking bail 316 from the notch 317 in its associated typewheel car feed sliding member 296. The locking member 319 is shown in such a position in Fig. 2, as held by the stop member 149a, and in such a position the typewheel car feeding mechanism is not operated on the accompanying cycle of operation as above described. The stop members 149a, 149b and 149c are selected in response to such code groups as the shift, unshift and other signal groups wherein it is desirous not to perform a typewheel car advancing operation, and the selection of any one of these stop members pivots the locking member 319 to remove the bail 316 from the notch 317.

On the selection of any of the stop members other than 149a, 149b and 149c, the locking bail 316 will be in the notch 317 in its associated sliding lever 296. With the sliding lever thus locked, the pivot for the floating lever will be about the pin 294 connecting the lower end to the sliding lever 296, and as the cam 213 rocks the operating lever 307, the upper end of the floating lever and the link 288 together with the plate 281 and operating pawl 283 will move to the left to step the ratchet wheel 276. On the back stroke of the link 288, the pawl 283 engages another tooth ready to advance the toothed disc 276 on the next operation of the link. The movements of the above-described elements are such that the toothed disc 276 is stepped the distance of one tooth on each operation of the link 288, and the diameters of the disc 276 and drum 274 are such that the advancement of the disc 276 one tooth causes the typewheel car to be advanced a distance of one letter space.

A holding pawl 331, Fig. 3, has a tooth 332 which cooperates with the teeth of the disc 276 to hold the disc in its operative position during the back stroke of the operating pawl 283. The holding pawl 331 is pivoted on a shoulder screw 333 in the frame section and is in the form of a bell crank. In the left hand arm of the holding pawl is a shoulder screw 334 which serves to connect thereto the left hand end of a link 336. The right hand end of the link 336 is attached by means of a pin 337, Fig. 5, to the upper end of a floating lever 338. The lower end of the floating lever 338 is pivotally connected by means of a pin 339 to the left hand end of a typewheel car return sliding lever 341. The stud 306 in the upper end of the operating lever 307 extends through a slot 342 in a floating lever 338 to operate the same simultaneously with the operation of the floating lever 391. A spring 343 attached to the link 336 holds the upper end of the floating lever 338 against the bracket 293, while another spring 344 is effective to hold the sliding lever 341 against the stop 301 and the floating lever 338 in its normal position.

A typewheel car return function is effected by disengaging the operating pawl 283 and the holding pawl 331 from engagement with the toothed disc 276. This is accomplished by operating the link 336 and its operation is controlled by the sliding lever 341. The typewheel car feed sliding lever 296 is normally locked and accordingly a typewheel car advancing function normally occurs for each cycle of operation. The selective unlocking of the sliding bar 296 prevents a typewheel car advancing operation from occurring. The typewheel car return sliding lever 341 is normally unlocked, and the same is selectively locked to perform a typewheel car return function.

A locking member 346 is pivoted on the left hand stud 297 and has a bail section 347 in operative relation with a notch 348 adjacent the upper right hand end of the car return sliding lever 341. Normally the bail 347 is above and out of the notch 348, and hence on each operation of the operating lever 307, the floating lever 338 pivots idly about the pin 337 in the upper end thereof. The upper end of the locking member 346 carries a screw 349 which has the lower end thereof resting on an arm 351 extending from the lower end of a lever 352, Figs. 5 and 6, pivotally supported on a shoulder screw 353. A spring 354 associated with the lever 352 is effective to pivot the same to normally hold a screw 356 in the arm 351 in engagement with the bent angle portion 357 formed on the extended end of the carriage return stop member 149d. The lever 352 in addition to normally holding the bail portion 347 of the locking member 346 out of the notch in the associated sliding bar functions in the manner hereinafter pointed out to effect automatic typewheel car return.

On the selection of the typewheel car return stop member 149d, the section 357 on the extended end thereof moves so as to pivot the lever 252 in a counterclockwise direction, which allows the locking member 346 to pivot and to place the bail section 347 thereof in the notch 348. With the bail section 347 in the notch 348, the sliding lever 341 is locked, and as the operating lever 307 subsequently moves to the left, the floating lever 338 will pivot about its lower end at the pin 239 to move the link 336 to the left. The leftward movement of the link 336 withdraws the holding tooth 332, Fig. 3, from engagement with the toothed disc 276, while the projection 357 on the right hand arm of the holding pawl 331 engages the rightwardly extending arm 358 of the operating pawl 283 to also cause its disengagement from the toothed disc 276. On the disengagement of both pawls from the disc 276, the spring drum 268, Figs. 1 and 2, is effective to return the carriage to the beginning of a new line of print.

To insure that the operating and holding pawls are disengaged from the tooth 276 a sufficient length of time to permit the return of the typewheel car to its extreme left hand position, a locking lever 359 is provided which locks the pawls out of engagement with the disc until the typewheel car is in its extreme left hand position. The locking lever 359 is pivoted on the collar 277, Fig. 9, and has a spring 361 attached thereto which tends to pivot the same in a clockwise direction, as viewed in Fig. 3. When the link 336 pivots the holding pawl 339 in a counterclockwise direction, a shoulder 362 on the locking lever 359 is permitted to engage the lower end of a pin 363 in the holding pawl to lock the same in its operated position. Just as the drum 274 rotates a sufficient amount to permit the typewheel car to reach its extreme left hand position, a pin 365 on the disc 276 engages the locking lever 359 to pivot the same a slight amount and disengage the shoulder 362 thereon from the lower end of the pin 363. Thereupon the spring 364 attached to the holding pawl 331 is effective to pivot the same back into engagement with the toothed disc 276. The last-described movement of the holding pawl 331 permits the spring 286 to also pivot the operating pawl back into engagement with the toothed disc, and the feeding mechanism is operable then to advance the typewheel car for another line of printing. A screw 366, Figs. 2 and 9, on the underside of the drum 274 engages a stop 367 secured to the frame section 279 to stop the drum and toothed disc 276 in their normal stop position with the typewheel car in its extreme left hand position ready to begin a new line of print. Thus, the typewheel car in response to a typewheel car return signal is returned to its left hand position ready to begin the printing of a subsequent line. The recording paper is advanced in conjunction with the typewheel return car function in a manner hereinafter described to advance the last printed line and present a clear line in operative relation with the typewheel.

In the preferred embodiment of the invention, the typewheel car is adapted to automatically return to its left hand position to begin the printing of a new line of print on the first word space signal following the advancement of the typewheel car to within a predetermined distance of the end of a line. With such an arrangement no typewheel car return signals are required, and the page printer herein disclosed will operate on the same signals that may be used to control the operation of a tape printer, wherein typewheel car return signals are not needed. The elements included in the mechanism for automatically returning the typewheel car are shown in Figs. 2, 3, 5 and 9, and their arrangement and operation will now be described. Clamped to the upper end of the vertical stud 278 by means of the nut 368 is a stationary plate 369 with a slot 371 therein. The slot 371 guides the left hand end of a curved lever 372 so that the extreme left hand end of the lever rests on the upper face of the toothed disc 276 and in the path of a cam projection 373 fixed to the upper face of the disc. A flat leaf spring 374 assists in holding the extreme left hand end of the lever 372 on the upper face of the disc 276. The right hand end of the curved lever 372 is pivotally attached by means of a shoulder screw 376 to the upper end of the hereinbefore mentioned lever 352. Adjacent the center of the lever 372 is a depending bracket 377 which has on the lower end thereof a rightwardly extending projection 378. With the left hand end of the lever 372 in engagement with the upper face of the toothed disc 276, the projection 378 on the bracket 377 is positioned a slight distance below the extended end of the word space stop member 149e. The stop member 149e is selected in response to word space signals, and on selection thereof the end in operative relation with the stop arm on the typewheel shaft moves toward the center of the typewheel shaft, while the extended end near the projection 378 moves to the left, as shown in Fig. 5.

The selection of the stop member 149e at any time before the typewheel car has advanced within a predetermined number of character spaces from the end of the line permits the extended end thereof to pass above the projection 378 on the bracket 377. However, when the disc 278 has been stepped or rotated a sufficient amount to bring the typewheel car within the predetermined distance from the end of a line, the cam member 373 engages the left hand end of the lever 372 to raise the same and place the notch in the projection 378 opposite the extended end of the stop member 149e. With the projection 378 in this position, the next time the stop member 149e is selected the movement of the extended end thereof to the left causes it to engage the projection 378 on the bracket 377 and move the same, together with the lever 372, a slight amount to the left.

The leftward movement of the lever 372 causes the lever 352 secured to its right hand end to pivot in a counterclockwise direction. This pivoting of the lever 352 moves the arm 351 at the lower end thereof away from the screw 349 in the locking member 346. This allows the said locking member to pivot in a clockwise direction and place the bail section 347 thereof in the notch 348 of the typewheel car return sliding lever 341. With the sliding lever 341 locked by the bail section 347, the next operation of the operating lever 307 causes the link 336 to move to the left, as hereinbefore described, and effect disengagement of the pawls from the toothed disc 276. Thus, in response to a word space signal following the advancement of the typewheel car to within a predetermined distance from the end of the line, the typewheel car is automatically returned to its extreme left hand position ready for the beginning of a new line of print.

In conjunction with each typewheel car return function the recording paper is advanced one line, and the elements for performing this function, which are shown principally in Figs. 3, 7 and 8, will now be described. The line feed cam 214 on the sleeve 216, which makes one revolution in conjunction with each cycle of operation, has in operative relation therewith a cam follower 379 mounted adjacent the center of an operating lever 381 similar to the hereinbefore described operating lever 307. The lower end of the operating lever 381 is mounted on the rod 308 and carries in its upper end a shoulder screw 382 which extends through a vertical slot 383 adjacent the center of a line feed floating lever 384. The lower end of the floating lever 384 is pivotally attached by means of a pin 386 to the left hand end of a line feed sliding bar 387. The line feed sliding bar, similar to the other previously described sliding bars 341 and 296, is slidably mounted on the studs 297. The upper end of the floating lever 384 is pivotally attached to the right hand end of a link 388. The other end of the link 388 is pivotally attached by means of a shoulder screw 389 to the upper end of a U-shaped member 391. The U-shaped member 391 is pivotally mounted on the feed wheel shaft 255 which has fixed thereto the feed wheel 256, Fig. 11, around which the recording paper passes. A spring 393 coiled about the shoulder screw 389 holds a pawl 394 pivotally mounted on the screw 389 in engagement with the teeth of a ratchet wheel 396 secured to the shaft 255 for rotation therewith.

The operation of the upper end of the line feed floating lever 384 to the left pivots the U-shaped member 391 to cause the pawl 394 to rotate or step the ratchet wheel 396. The feed wheel 256 rotates with the ratchet 396 and its rotation advances the recording paper. The upper end of the line feed floating lever 384 is caused to move to the left by locking the sliding lever 387 attached to the lower end of the floating lever. Ordinarily, the sliding lever is unlocked and slides idly to the left during the movement of the operating lever 381, it being returned to its normal right hand position by the spring 397 attached to the floating lever 384.

The locking of the line feed sliding lever 387 is accomplished by either the bail section 347 of the locking member 346 or by the bail section 398 of the line feed locking member 399. The line feed locking member 399 is pivotally mounted on the right hand stud 297 and the bail section 398 thereon is in operative relation with a notch 401 in the upper side of the sliding lever 387. The bail section 347 of the locking member 346 is in operative relation with a notch 402 in the sliding lever 387 so that the operation of either of the locking members 346 or 399 to lock the sliding lever 387 during movement of the operating lever 381 effects a line feed function.

When a line feed function is to be performed without an accompanying typewheel car return function, the stop member 149f is selected, the selection of which moves the flange 403 on the extended outer end in a downward direction. The flange 403 is normally engaged with a screw 404 carried in the locking member 399 so that, when the flange 403 moves downward, the locking member 399 is permitted to pivot in a counterclockwise direction to place the bail section 398 thereon in the notch 401. This locks the sliding lever 387, and on the subsequent operation of the operating lever 381 a line feed function will be performed. Thus, a line feed function is performed in response to a line feed signal which is operative to select the line feed stop member 149f.

As hereinbefore stated, a line feed function is invariably performed in conjunction with a typewheel car return function. In the preferred embodiment, both of these functions are performed in response to a typewheel car return signal, or in conjunction with the automatic performance of the typewheel car return function in response to a word space signal after the typewheel car has advanced to within a predetermined distance from the end of the line. The bail section 347 of the locking member 346 which is effective to lock the typewheel car return sliding member 341, Fig. 5, by entering the notch 348 therein is also effective to lock the line feed sliding lever 387, Fig. 7, by entering the notch 402 in the latter sliding lever. Hence, whenever the locking member 346 pivots in a clockwise direction, either in response to the selection of the typewheel car return stop member 149d or in response to the automatic operation thereof on a word space signal, after the typewheel has advanced a predetermined distance, both the sliding levers 341 and 387 are locked. The locking of these sliding levers, as hereinbefore described, effects the performance of a typewheel car return function and a line feed function.

With the printer operating at a relatively high rate of speed, such as at the rate of 360 characters a minute, the return of the typewheel car from the end of one line of print to the beginning of another must be accomplished in a relatively short interval of time if the same is to occur during a single code group interval. Obviously, where the typewheel car is returned at a high rate of speed, some means is necessary to gradually slow it down and absorb the shock of stopping the same as it reaches its left hand position. Heretofore dash-pots were generally used which had a number of moving parts, such as pistons, piston rods, etc. The dash-pots used heretofore were expensive to manufacture, had wearing parts, and their operating characteristics were variable and were affected by temperature changes. In accordance with the present invention, a simplified and improved typewheel car arresting means is employed which, as shown in Fig. 10, includes an open-ended cylinder 406 secured to and mounted adjacent the left hand end of the typewheel car guide rod 196. The cylinder 406 has the open end toward the right and is mounted concentrically with the guide rod 196. A piston 407 slightly smaller than the inside diameter of the cylinder 406 has a flange 408 thereon and is attached to the left hand side of the typewheel car 197.

The piston 407 moves with the typewheel car 197, and just before the typewheel car reaches the end of its leftward movement the piston enters the cylinder 406. The piston acts to compress the air in the cylinder, which serves as a cushion to bring the typewheel car to a stop without undue shock or noise. The air escapes out of the cylinder 406 around the piston 407, as the piston 407 does not form an air-tight fit in the cylinder. In the preferred embodiment, there is no contact between the piston and the cylinder, and hence there is no wear to effect the operating characteristics. The flange 408 on the piston 407 abuts the outer end of the cylinder 406 to limit the leftward movement of the typewheel car 197, and at the time of engagement thereof the typewheel car will be moving at such a slow rate that no appreciable noise or jar is produced. The advantages of the above arrangement are apparent, especially from a manufacturing point of view, as the piston 407 and cylinder 406 are both mounted or positioned by means of the guide rod 196, and as long as the same are centrally drilled and mounted, no adjustment thereof need be made. Another advantage of the above arrangement in addition to the above of having no wearing parts and no change in the operating characteristics of the arresting arrangement during normal operating conditions is that the arresting means is operable only during a small fraction of the normal travel of the typewheel car. The latter feature permits the typewheel car to travel at its maximum speed during a large part of its return movement, and accordingly less time is needed for the entire operation.

Figure 24:
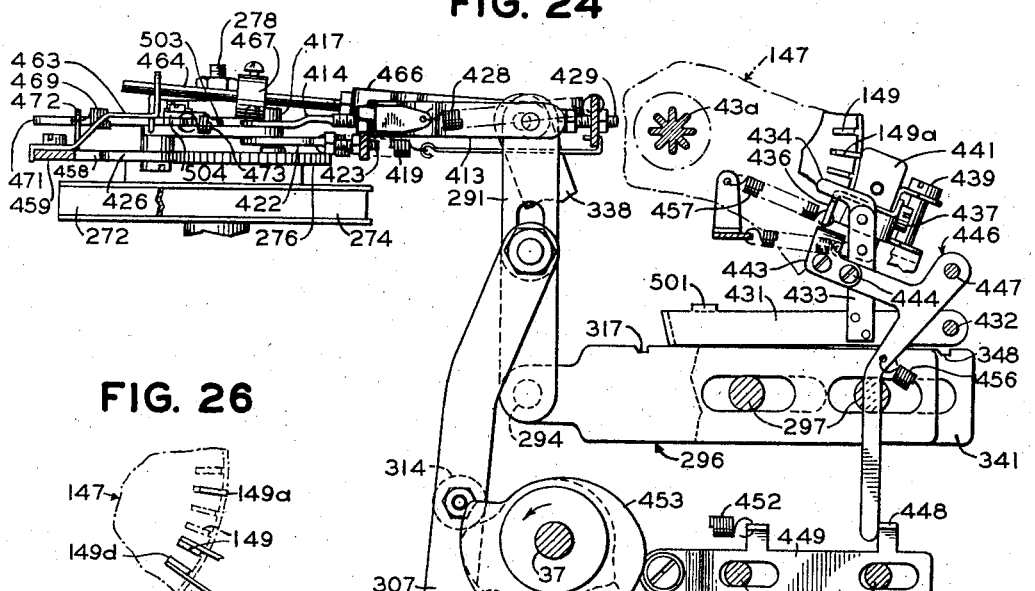
Fig. 24 is a vertical sectional view showing a modified arrangement of the mechanisms for performing some of the function controls.
Figure 25:
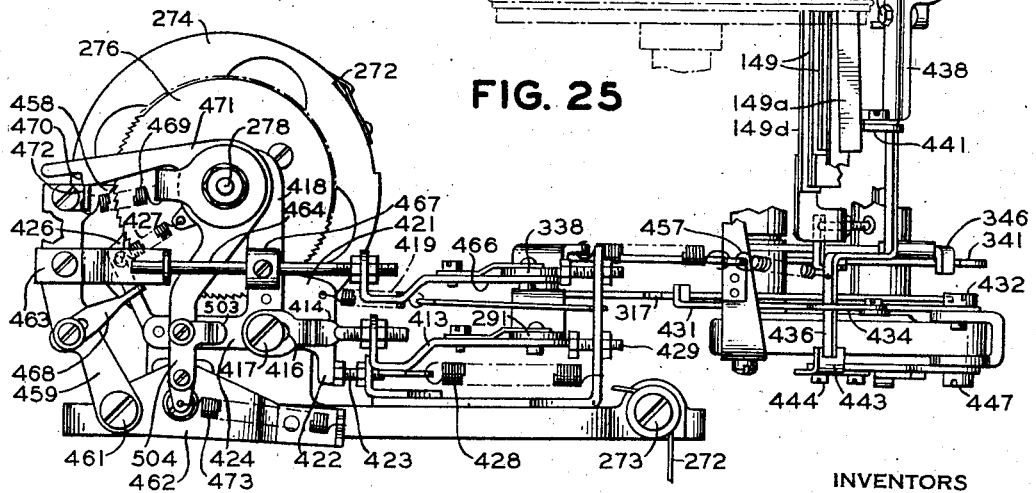
Fig. 25 is a plan view of some of the elements of Fig. 24.

Referring now to Figs. 24 and 25, a modification of the mechanism for performing the typewheel feed or letter spacing function, together with the typewheel car return function, will now be described. As in the previously described arrangement, the power for performing the above-enumerated and other functions is derived from the secondary operating sleeve on the shaft 37 arranged to make one revolution in conjuction with the receipt of each code combination of impulses. The particular cam for performing the letter spacing operation is slightly different in the modification than in the previously described arrangement and hereinafter is referred to by reference numeral 213a. The cam 213a has a large hump 411 and a smaller hump 412 thereon approximately 180° apart. The large hump 411 is effective to perform the letter spacing operation, while the smaller hump 412 resets the feed mechanism following a car return function in a manner hereinafter described.

The same letter spacing feed lever 307 with a follower 314 adjacent the center thereof in operative relation with the periphery of the feed cam 213a is employed, while at the upper end of the operating lever 307 is the floating lever 291. As in the previously described arrangement, the lower end of the floating lever is pivotally connected to the sliding lever 296, while connected to the upper end thereof is a leftwardly extending link 413. The link 413 carries in the left hand end thereof a member 414. The member 414 has on the left hand portion thereof an elongated slot 416 adapted to engage a shoulder screw 417 carried adjacent the free end of a lever 418 pivotally mounted on the stud 278, which also supports the winding drum 274 and the feed ratchet wheel 276. A spring 419 attached to a plate 421 secured to the lever 418 tends to pivot said lever in a counter-clockwise direction, as viewed in Fig. 25, to hold a toe 422 of the plate 421 against the head of an adjustable stop screw 423. Pivotally carried in the end of an arm 424 of the lever 418 is an operating pawl 426 which is normally held by means of a spring 427 in engagement with the teeth of the ratchet wheel 276.

When the sliding lever 296 is unlocked, the operating lever 307 during the operation thereof is effective to slide the sliding lever to the left with the upper end of the floating lever 219 pivoting at the point where it is connected to the link 413. A spring 428 attached to the link 413 holds the right hand end thereof against an adjustable stop screw 429 as the sliding lever 296 moves to the left. The locking of the sliding lever 296 in its right hand position during the oscillation of the operating lever 307 to the left effects movement of the link 413 to the left, which in turn by means of the member 414 and shoulder screw 417 causes the lever 418 to pivot in a clockwise direction. During such pivoting of the lever 418, the operating pawl 426 advances the ratchet wheel 276 and drum 274 a predetermined amount, and the band 272 is thus wound up on the drum and is effective to advance the typewheel car. The movement of the member 414 to the left on the above-described operation is effected by the larger hump 411 on the cam 213a and is sufficient to take up the lost motion between the shoulder screw 417 and the elongated slot 416 and also effect sufficient movement of the lever 418 and operating pawl 426 to advance the ratchet wheel. Thus, for each cycle of operation in which the sliding lever 296 is locked, the typewheel car will be advanced a distance equal to one letter space.

The modified embodiment of controlling the sliding lever 296 removes a considerable portion of the load that is imposed upon the stop members 149 of the stop drum 147 in the previously described arrangement. In the modified arrangement, the stop members 149 have very little work to do in controlling the sliding lever, they merely controlling an interponent, and power for operating the associated locking member is supplied from the operating shaft. The locking member 431 for the typewheel car feed sliding lever 296 is pivotally mounted on a pivot 432 which and has an upwardly extending arm 433 which has a leftwardly extending projection 434 at the upper end thereof. The projection 434 extends over the end of a lever 436 which is pivotally mounted at its opposite end on a substantially horizontal shoulder screw 437. The shoulder screw 437 is carried in a bracket member 438 pivotally mounted on a substantially vertical shoulder screw 439. The bracket member 438 has a short plate 441 secured to the free end thereof which is in operative relation with the extended ends of the stop members such as 149a, the selection of any one of which in a cycle of operation of the printer is effective to disable the car feeding mechanism. The selection of any one of the stop members such as 149a moves the extended end thereof to the right, as shown in Fig. 25, to engage the plate 441 and pivot the bracket member 438 a slight amount in a counterclockwise direction. As the bracket member 438 thus pivots, the lever 436 pivots therewith so as to place the free end thereof over the bent portion of a bracket 443 secured by screws 444 to the leftwardly extending arm of a bell crank 446. The bell crank 446 is pivoted on a shoulder screw 447 and has a depending arm, the lower end of which is held in engagement with a lug 448 on a slide bar 449 by means of a spring 456. The slide bar 449 is mounted on screws 451 and is arranged for horizontal movement by a spring 452 attached thereto and a cam 453 in operative relation with a roller 454 on the left hand end of the slide bar.

At a predetermined point in the cycle of operation of the receiver, the cam 453 permits the spring 452 to move the slide bar 449 to the left, and during such movement of the slide bar the lug 448 thereon engages the depending arm of the bell crank 446 to pivot the same in a clockwise direction. This pivoting movement of the bell crank 446 raises the bracket 443 on the leftwardly extending arm thereof, and, if at this time the end of the lever 436 is positioned over the bracket, it raises therewith. The end of the lever 436 in raising engages the projection 434 and effects pivoting of the locking member 431 in a clockwise direction to withdraw the locking portion of the locking member out of engagement or operative relation with the associated notch 317 in the sliding lever 296. Thus, the sliding lever 296 is unlocked, and a letter spacing function will not be performed in the accompanying cycle of operation of the printer. When any but the extended stop members such as 149a are selected, the end of the lever 436 will be to the left of the bracket 443 on the bell crank 446, and hence the cyclically operating bell crank will not be effective to raise the locking member 431 during such cycles of operation. From the above arrangement it is evident that the only load imposed upon the stop members is to pivot the bracket member 438, which carries the lever 436 against the action of a comparatively weak spring 457, and the work of raising the locking member 431 from operative relation with its associated sliding lever 296 is accomplished by power supplied from the cam 453.

The return of the typewheel car for the beginning of a new line of print is effected by disengaging the operating pawl 426, Fig. 25, and a retaining pawl 458 from engagement with the teeth of the ratchet wheel 276. When the pawls are disengaged, the spring drum 268, Fig. 1, is effective to return the typewheel car to its extreme left hand position for the beginning of a new line of print. The retaining pawl 458, Fig. 25, is formed on the free end of a lever 459 pivoted on a shoulder screw 461 in a bracket 462 attached to the frame. A bracket 463 is attached to the lever 459 and supports therein the left hand end of a push rod 464, the other end of which is adjustably secured in the left hand end of a link 466 attached to and operated by the typewheel car return floating lever 338, shown dot-dashed in Figs. 24 and 27. The lower end of the floating lever 338 is attached to the typewheel car return sliding lever 341, and the locking of the associated sliding member causes the upper end of the floating lever to move to the left on the oscillation of the attached operating lever 381. The operating lever 381 also is arranged to operate the line spacing mechanism as in the previously described arrangement and is controlled by the cam 214a.

When the typewheel car return sliding lever 341 is locked and the upper end of the associated floating lever 338 moves to the left, as shown in Figs. 24 and 25, the link 466 and push rod 464 move therewith. After sufficient movement of the push rod 464 to bring a collar 467 thereon in engagement with the bracket 463, the lever 459 is caused to pivot in a counterclockwise direction. This pivoting of the lever 459 withdraws the retaining pawl 458 from engagement with the teeth of the ratchet wheel 276, while a hook member 468 attached to the lever 459 engages the operating pawl 426 to withdraw it out of engagement with the ratchet wheel. The counterclockwise pivoting of the lever 459 is against the action of a spring 469 attached thereto and, when pivoted sufficiently, allows a shoulder 470 on a lock-out lever 471 to engage a bracket 472 attached to the lever 459 to hold said lever in its operated position. The lock-out lever 471 is pivoted on the stud 278 and has a spring 473 attached to the depending arm thereof, as viewed in Fig. 25, which biases the lock-out lever to pivot in a counterclockwise direction. Thus, the pawls are disengaged from the teeth of the ratchet wheel 276 and locked out of operative relation therewith by the lock-out lever 471, and the teeth remain in this position until pivoting of the lock-out lever in a clockwise direction, in a manner hereinafter described.

Figure 26:
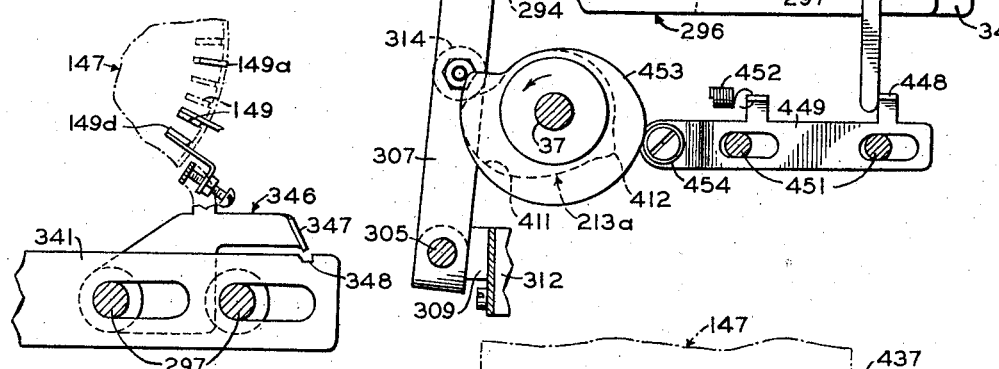
Fig. 26 is a vertical sectional view of some of the elements included in the modified function control arrangement.

As shown in Fig. 26, the locking of the typewheel car return sliding lever 341 may be accomplished by the locking member 346 as controlled by the selective operation of the stop member 149d or by another locking member 474, Figs. 27, 28 and 29, which when operated is adapted to also lock the sliding member 387 included in the line feed mechanism. The line feed mechanism includes, besides the sliding lever 387, the floating lever 384 and a link 476 adapted to operate a pawl 477 to advance a ratchet wheel 478 on the platen shaft 255. The line feed sliding lever 387, which is adapted to be locked simultaneously with the car return sliding lever 296 by means of the locking member 474, has an individual locking member 479 controlled by an associated stop member 149f.

The locking member 474 is arranged to be automatically operative on a word space code group after the typewheel car has advanced to within a predetermined distance from the end of a line. With such an arrangement, a special typewheel car and line feed signal is not required, as the first word space signal received when the typewheel car has advanced a predetermined distance automatically effects the typewheel car return function and the advancement of the recording paper.

The locking member 474 is biased to pivot in a counterclockwise direction by an attached spring 481 and is normally held in a non-locking position by means of a lever 482 pivotally mounted on a shoulder screw 483. A spring 484 attached to the lever 482 tends to pivot the same in a counterclockwise direction so that the right hand end thereof, as shown in Fig. 29, engages a ledge 486 of the locking member 474 to hold the same in its non-locking position against the action of its attached spring 481. When the typewheel car, indicated generally by reference numeral 197, Fig. 29, approaches to within a predetermined distance of the end of a line, the sloping surface 487 on a lever 488 adjustably attached by means of screws 489 to the typewheel car engages a pin 491 in the lever 482 to pivot the same against the action of its attached spring 484 a slight amount in a clockwise direction. The pivoting of the lever 482 in this direction permits the locking member 474 to pivot a slight amount, or until the ledge 486 engages the hooked end 490 of a depending arm of a bell crank 492, Fig. 27. This pivoting of the locking member 474 is insufficient to permit the same to lock its associated line feed and typewheel car return sliding levers, but merely sufficient to take up a slight amount of clearance between the hook 490 and the ledge 486. The bell crank 492 is pivoted at 493 and has attached to a short depending arm 494 a spring 496 which holds said arm against the extended end of the letter space stop pin 149e.

On the selection of the letter space stop pin 149e, the bell crank 492 is permitted to pivot the hook 490 out from beneath the ledge 486, and if at this time the locking member 474 is not held in an operated position by the lever 482, the locking member is permitted to pivot an amount sufficient to lock the associated line feed and typewheel car return sliding levers. Hence, on the subsequent operation of the operating lever 381 by the cam 214a, a typewheel car return function and a line feed function will be effected. Thus, the selection of the word space stop pin 149e after the carriage has advanced sufficiently for the member 488 to pivot the lever 482 the above two functions are automatically performed. The point in the line of travel of the typewheel car at which the word space signal may be effective to cause the automatic typewheel car return function can be varied by changing the position of the member 488 on the typewheel car, slots in the member 488 being provided for such adjustment.

The letter space stop pin 149e on its selection does not ordinarily unlock the typewheel car feed sliding lever 296, and hence a typewheel car feed operation is usually performed in conjunction with the selection of the word space stop pin 149e. However, on the selection of the word space stop pin 149e after the typewheel car has approached to within a predetermined distance from the end of the line to initiate the automatic typewheel car return function, it is desirable to eliminate the normal feed operation during this cycle of operation for reasons hereinafter apparent, and this is accomplished by means of a lever 498, Figs. 28 and 29, pivotally mounted adjacent its center on a shoulder screw 499 between the locking members 431 and 474. The ends of the lever 498 extend beneath ledges 501 and 502 on the locking members 431 and 474, respectively, and when the car return and line feed locking member 474 is allowed to pivot and enter notches in the associated sliding levers, it also causes the lever 498 to pivot in a clockwise direction, as shown in Fig. 29, to lift the end of the locking lever 431 out of the notch in the feed or letter spacing sliding lever 296. Accordingly, for the accompanying cycle of operation of the printer, the sliding lever 296 is unlocked, and the elements attached to the upper end of its associated floating lever will not be operated, and no feed function will occur.

On return of the operating lever 381, Fig. 27, to its normal position, the locking member 474 is permitted to pivot in a clockwise direction back into its normal position by means of the spring 484 and lever 482, which in turn allows the locking member 431 to return to its normal position where it may lock the sliding lever 296 during the following cycle of operation, provided the same is not held out by means hereinafter described. The timing of the operation of the lever 381 is such that the locking member 474 is not permitted to return to its normal position until after the sliding member 296 controlling the typewheel feed or advancing mechanism has started into operation, and accordingly for a typewheel car return cycle of operation the sliding lever 296 merely slides idly back and forth.

On the performance of a typewheel car return function, the operating pawl 426 and the retaining pawl 458, Fig. 25, are locked out of operative relation with the ratchet wheel 276 by means of the lock-out lever 471, and the pawls remain in this position until the following cycle of operation, or one in which a typewheel car return feed operation is performed. The pivoting of the lock-out lever 471 to a position to lock the pawls out of engagement with the ratchet wheel 276 brings a projection 503 on a bracket 504 adjustably attached to the depending arm of the lock-out lever 471, as shown in Fig. 25, into operative relation with the end of the member 414 included in the feed mechanism. Accordingly, during the following cycle of operation in which the feed control sliding lever is not blocked, the small hump 412, Fig. 24, on the feed cam 213a moves the member 414 a slight amount to the left, as shown in Fig. 25, or an amount approximately equal to the length of the slot 416. This movement of the member 414 engages the left hand end thereof with the projection 503 of the bracket 504 to pivot the lock-out member 471 in a clockwise direction, which removes the ledge 470 thereon from beneath the bracket 472 on the retaining pawl lever 459. Thus, the spring 469 is permitted to pivot the retaining pawl 458 back into engagement with the ratchet wheel 276, which also permits reengagement of the operating pawl 426 with the ratchet wheel. In the same cycle of operation, the larger hump 411 on the feed cam 213 subsequently operates the feed mechanism to advance the drum in the usual manner.

The above-described arrangement has the obvious advantage that a time interval equal to more than one character is allowed for the return of the typewheel car from an operated position to its extreme left hand position, and a feed operation which occurs after the printing operation in the accompanying cycle is invariably performed on the first cycle of operation following a typewheel car return function unless the same is suppressed selectively.

The modified arrangement for feeding the recording paper 249, as shown in Fig. 30, consists of two guides or chutes 506 and 507. The chute 507 guides the recording paper to the feed platen 256, while the chute 506 guides the paper up between the typewheel 194 and the print bail 248. The feeding of the recording paper is accomplished by rotating the shaft 255 and platen 256 in the manner hereinbefore described, and the paper is held in engagement with the platen wheel 256 by means of rollers such as 508. The rollers 508 are carried in the upper ends of levers 509 and 511 which are pivoted adjacent the centers thereof on a pivot rod 512. A spring 513 attached to the depending arms of the levers 509 and 511 tends to pivot the same in clockwise and counterclockwise directions, respectively, to hold the rollers 508 supported in the upper ends thereof against the platen wheel 256.

In order to facilitate the insertion of a new blank or the beginning of a roll of recording paper in the printer, means are provided for disengaging the rollers 508 from the recording platen 256. This is accomplished by means of a lever 514 of rectangular cross-section extending between the levers 509 and 511 above the pivot 512. On the depression of the handle 516 of the lever 514, the upper ends of the levers are spread apart and move the rollers 508 out of engagement with the platen wheel 256.

It will be obvious to those skilled in the art that various modifications of the invention other than those described herein and shown in the accompanying drawings may be made without departing from the spirit or essential attributes thereof, and it is desired, therefore, that only such limitations be placed thereon as are imposed by the prior art or are specifically set forth in the appended claims.

What is claimed is:

1. In a cyclically operable printing telegraph machine, a selecting mechanism responsive to permutation signal groups, a typewheel shaft with a typewheel movable to and fro thereon, a typewheel shaft stop unit controlled by said selecting mechanism and having a plurality of selectable members, means including said selectable members for stopping said typewheel and shaft in selected angular positions, a typewheel feeding mechanism, a typewheel return mechanism, a paper feeding mechanism, said mechanisms being operable during cycles of operation of said machine, and means including said selectable members for selectively controlling the operation of said mechanisms independently of the position of said typewheel shaft.

2. In a cyclically operable printing telegraph machine, a selecting mechanism responsive to permutation signal groups, a typewheel shaft and a typewheel movable to and fro thereon, a typewheel shaft stop unit controlled by said selecting mechanism having a plurality of independently selectable members, means including said selectable members for stopping said typewheel and shaft in selected angular positions, a typewheel feeding mechanism, a typewheel return mechanism, a paper feeding mechanism, said mechanisms being operable during cycles of operation of said machine, and means including said selectable members for selectively controlling the operation of said mechanisms to perform one or more associated functions in a single cycle of operation of said machine independently of the position of said typewheel shaft.

3. In a recording telegraph machine, a typewheel shaft stop unit including a series of selectable members for stopping said shaft in selected angular positions, a selector mechanism for controlling said stop unit, a function performing mechanism including a cyclically operable member, a second member operated through one or the other of two paths of motion by said cyclically operable member, means controlled by said second member in one of said paths of motion for effecting the associated function and means controlled by predetermined of said selectable members for determining the path of motion through which said second member is operated by said cyclically operable member independently of the position of said typewheel shaft.

4. In a telegraph recorder for permutation code signals including a typewheel, a typewheel shaft and a typewheel shaft stop unit, said stop unit including a plurality of selectable stop members for stopping said shaft and typewheel in selected angular positions, a typewheel advancing mechanism for advancing said typewheel along said shaft, means for controlling said typewheel advancing mechanism to advance said typewheel during predetermined cycles of operation of said recorder and not to advance said typewheel during other predetermined cycles and means including predetermined of said stop members for controlling said last mentioned means independently of the position of said typewheel shaft.

5. In a cyclically operable telegraph recorder responsive to received permutation code signals including a typewheel, a typewheel shaft and a typewheel shaft stop unit, said stop unit including a plurality of selectable stop members for stopping said shaft and typewheel in selected angular positions, a plurality of function performing mechanisms, each of said mechanisms including a member movable through a plurality of paths of motion, said paths including an operating path and an unoperating path, means operated by said members in moving through said operating paths of motion for operating associated mechanisms to perform associated functions, means whereby said members in moving through said unoperating paths of motion retain said associated mechanisms inoperative and means independent of said typewheel shaft and controlled by predetermined of said stop members for determining which of said function mechanisms operate in cycles of operation of said receiver.

6. In a cyclically operable telegraph receiver responsive to received permutation code signals, a typewheel shaft stop unit including a series of notched discs and a plurality of selectable members, said members being selected by entering rows of aligned notches in said discs, a plurality of floating levers movable in a plurality of modes of motion, a longitudinally movable member associated with each one of said floating levers, function operating mechanisms associated with each one of said floating levers, means controlled directly by predetermined of said selectable members for selectively locking said longitudinally movable members, and means effective on the locking of a longitudinally movable member to move the associated one of said floating levers through the mode of motion wherein it operates its associated function mechanism.

7. In a cyclically operable telegraph receiver responsive to received permutation code signals, a typewheel shaft stop unit including a series of notched discs and a plurality of selectable members, said members being selected by entering rows of aligned notches in said discs, a plurality of levers pivotable about one or the other of two points, cyclically operable means for operating said levers, a slidable member and a function operating link associated with each of said levers, locks for said slidable members, means including said selectable members for controlling said locks to selectively lock said slidable members, means effective on the locking of one or more of said slidable members to pivot associated of said levers about a predetermined one of said two points and means for operating the associated function operating links to perform the associated functions on the pivoting of said levers about the predetermined one of said two points.

8. In a cyclically operable telegraph receiver responsive to received permutation code signals, a typewheel shaft stop unit including a series of notched discs and a plurality of selectable members, said members being selected by entering rows of aligned notches in said discs, a plurality of floating levers, cyclically operating means associated with said floating levers, a plurality of function mechanisms, a function operating link extending between said function mechanisms and associated of said floating levers, sliding members individually associated with said floating levers, means including said cyclically operating means for moving said floating levers and said slidable members, locks for said slidable members controlled by said selectable members, and means effective on the locking of said sliding members to operate associated of said floating levers to move associated function operating links to operate associated function mechanisms.

9. In a cyclically operable telegraph receiver responsive to received permutation code signals, a typewheel shaft stop unit including a series of notched discs and a plurality of selectable members, said members being selected by entering rows of aligned notches in said discs, a plurality of floating levers, cyclically operating means associated with said floating levers, a plurality of function mechanisms, a function operating link extending between said function mechanisms and associated of said floating levers, sliding members individually associated with said floating levers, means including said cyclically operating means for moving said floating levers and said slidable members, locks for said slidable members controlled by said selectable members, means effective on the locking of said sliding members to operate associated of said floating levers to move associated function operating links to operate associated function mechanisms, means controlled by the selection of at least one of said selectable members for controlling said slidable member locks to lock the associated slidable member and means controlled by the selection of others of said selectable members to unlock the associated slidable members.

10. In a cyclically operable telegraph receiver responsive to received permutation code signals, a typewheel shaft stop unit including a series of notched discs and a plurality of selectable members, said members being selected by entering rows of aligned notches in said discs, a plurality of floating members, a plurality of cyclically operating elements, a plurality of lockable members, a plurality of function mechanism operating links, one of each of said operating elements, lockable members and said operating links being associated with said floating levers at different points thereon, means controlled by said selectable members for locking said lockable members against substantially all movement, means operative on the locking of a lockable member during the operation of an associated cyclically operating element to pivot the associated floating lever about the point of association thereof with said lockable member and to move the associated operating link to effect a function, and means operative with a lockable member unlocked during the operation of an associated cyclically operating element to pivot the associated floating lever about the point of association thereof with said operating link and to move the associated lockable member.

11. In a cyclically operable telegraph receiver responsive to received permutation code signals, a typewheel shaft stop unit including a series of notched discs and a plurality of selectable members, said members being selected by entering rows of aligned notches in said discs, a plurality of pivotable elements normally pivotable about predetermined points, a function mechanism associated with each of said elements, means controlled by said selectable members independently of the typewheel shaft in said stop unit for effecting the pivoting of said elements about other points and means for operating associated function mechanisms on the pivoting of said elements about one of said points.

12. In a printing telegraph machine selectively controlled in accordance with received code groups of impulses, a series of primary selector levers, means including a signal responsive device and a first independently rotatable member for selectively positioning said selectors, a series of secondary selector levers, means including a second independently rotatable member for transferring the setting of said primary selector levers to said secondary selector levers, a recording mechanism, means including said secondary selector levers for controlling said recording mechanism, means including a third independently rotatable member for operating said recording mechanism as controlled by said secondary selector levers, means controlled by said signal responsive device to initiate the rotation of said first rotatable member, means controlled by said first rotatable member to initiate the rotation of said second rotatable member and means controlled by said second rotatable member to initiate the rotation of said third rotatable member.

13. In a telegraph machine selectively operative in response to received signals, a typewheel shaft with a typewheel movable along the axis thereof, a typewheel advancing mechanism for advancing said typewheel in a letter spacing direction, a typewheel return mechanism for returning said typewheel to an initial position for the beginning of a line of print, a typewheel shaft stop unit including a plurality of selectable members for stopping said shaft in selected angular positions, a floating lever, cyclically operable means for operating said floating lever, a sliding bar and a control element associated with said floating lever, said sliding bar normally being moved and said control element remaining substantially stationary on operation of said floating lever, means for locking said slidable member, and means controlled by a predetermined one of said selectable members to operate said locking means to lock said sliding bar against movement by said floating lever whereby said floating lever operates said control element to render said typewheel return mechanism operative to effect the return of said typewheel to said initial position.

14. In a telegraph machine selectively operative in response to received signals, a typewheel shaft with a typewheel movable along the axis thereof, a typewheel advancing mechanism for advancing said typewheel in a letter spacing direction, a typewheel return mechanism for returning said typewheel to an initial position for the beginning of a line of print, a typewheel shaft stop unit including a plurality of selectable members for stopping said shaft in selected angular positions, a floating lever, cyclically operable means for operating said floating lever, a sliding bar and a control element associated with said floating lever, said sliding bar normally being moved and said control element remaining substantially stationary on operation of said floating lever, means for locking said slidable member, and means controlled by a predetermined one of said selectable members only after the advancement of said typewheel greater than a predetermined distance from said initial position to operate said locking means to lock said sliding bar against movement by said floating lever whereby said floating lever operates said control element to render said typewheel return mechanism operative to effect the return of said typewheel to said initial position.

15. In a telegraph recorder selectively controlled by received code groups of impulses, a to and fro movable typewheel, means for biasing said typewheel to an initial position at one end of its travel, a letter space feeding means including a ratchet wheel with an operating and a retaining pawl for moving said typewheel step-by-step against the action of said biasing means, selectively operable means for disengaging said operating and retaining pawls from said ratchet wheel whereupon said biasing means is operative to return said typewheel to said initial position, means for locking said pawls out of engagement with said ratchet wheel and means including said letter spacing means and independent of a letter spacing operation thereof for unlocking said pawls to permit the re-engagement thereof with said ratchet wheel.

16. In a telegraph recorder selectively controlled by received code groups of impulses, a to and fro movable typewheel, means for biasing said typewheel to an initial position at one end of its travel, a letter space feeding means including a ratchet wheel with an operating and a retaining pawl for moving said typewheel step-by-step against the action of said biasing means, means normally operative on the receipt of a predetermined code group to advance said typewheel, means operative on the receipt of said code group following the advancement of said typewheel a predetermined distance from said initial position to disengage said operating and retaining pawls from said ratchet wheel and permit said biasing means to return said typewheel to said initial position, means for locking said pawls out of engagement with said ratchet wheel and means including said letter spacing means and independent of a letter spacing operation thereof for unlocking said pawls to permit the re-engagement thereof with said ratchet wheel.

17. In a telegraph recorder, a typewheel shaft stop unit including a plurality of selectable members, a source of power, a function mechanism including a power operated floating member cyclically movable through either one or the other of two paths of motion, said floating member normally tending to move idly through the first of said paths of motion, means for compelling the movement of said floating member through the second of said paths of motion to perform the related function, means including said source of power for operating said compelling means and means controlled by predetermined of said selectable members independently of the typewheel shaft of said typewheel shaft stop unit for controlling the application of power to said compelling means.

18. In a telegraph recorder, a typewheel shaft stop unit including a plurality of selectable members, a source of power, a function mechanism including a power operated floating member cyclically movable through either one or the other of two paths of motion, said floating member normally tending to move idly through the first of said paths of motion, a slidable member associated with said floating member, a locking member for locking said slidable member to thereby compel the movement of said floating member through the second of said paths of motion to perform the related function, a member cyclically operated from said source of power, an interponent positionable between said cyclically operated member and said locking member whereby said locking member is operated to unlock said slidable member and means controlled by predetermined of said selectable members for controlling the position of said interponent either between or not between said cyclically operated member and said locking member to effect unlocking or locking respectively of said slidable member.

19. In cyclically operable telegraph recorder, a typewheel shaft, a typewheel axially movable along said shaft, a typewheel shaft stop unit including a series of selectable members for selectively stopping rotation of said shaft, a plurality of function mechanisms each including floating levers with operating means therefor and individually associated sliding members, locking members for locking said sliding members, said sliding members when locked causing associated floating levers to perform related functions, a first and a second latching means normally holding predetermined of said locking members out of locking engagement with associated sliding members, means controlled by predetermined of said selectable members for directly operating one of said latching means, means controlled by the position of said typewheel on said shaft for controlling the other of said latching means whereby said locking member locks predetermined sliding members to effect performance of related functions on the selection of said predetermined selectable member with said typewheel in predetermined position along said shaft, and means operative by said predetermined locking members for preventing locking operation of other of said locking members.

20. In a cyclically operable telegraph recorder, a typewheel shaft, a typewheel axially movable along said shaft, a typewheel shaft stop unit including a series of selectable members for selectively stopping rotation of said shaft, a plurality of function mechanisms each including floating levers with operating means therefor and individually associated sliding members, locking members for locking said sliding members, said locking member being controlled by the selection of predetermined of said selectable members to lock and unlock said slidable members, means operative on the selection of a predetermined one of said selectable members with said typewheel on a first part of said typewheel shaft to control a first locking member to lock the associated selecting member to effect an associated function, means operative on the selection of the same selectable member with said typewheel on a second part of said typewheel shaft to operate other of said locking members to effect other associated functions and to operate said first locking member to unlock its associated sliding member to prevent the operation of its function mechanism.

21. In a telegraph recorder for permutation code signals including a typewheel, a typewheel shaft and a typewheel shaft stop unit, said stop unit including a plurality of selectable stop members for stopping said shaft and typewheel in selected angular positions, a typewheel advancing mechanism for advancing said typewheel along said shaft, means for controlling said typewheel advancing mechanism to advance said typewheel during predetermined cycles of operation of said recorder and not to advance said typewheel during other predetermined cycles and means controlled by the selection of predetermined of said stop members independently of the position of said shaft for controlling said last mentioned means whereby said typewheel is not advanced during associated cycles of operation of said recorder.

22. In a cyclically operable telegraph recorder responsive to received permutation code signals including a typewheel, a typewheel shaft and a typewheel shaft stop unit, said stop unit including a plurality of selectable stop members for stopping said shaft and typewheel in selected angular positions, a plurality of function performing mechanisms, each of said mechanisms including a member movable through a plurality of paths of motion, said paths including an operating path and an unoperating path, means operated by said members in moving through said operating paths of motion for operating associated mechanisms to perform associated functions, means whereby said members in moving through said unoperating paths of motion retain said associated mechanisms inoperative, means including a single stop member independently of the position of said typewheel and shaft for controlling a first predetermined one of said function mechanisms and means including a second stop member independently of said typewheel and shaft for controlling a plurality of said function mechanisms.

23. In a cyclically operable telegraph recorder responsive to received permutation code signals including a typewheel, a typewheel shaft and a typewheel shaft stop unit, said stop unit including a plurality of selectable stop members for stopping said shaft and typewheel in selected angular positions, a plurality of function performing mechanisms, each of said mechanisms including a member movable through a plurality of paths of motion, said paths of motion including an operating path and an unoperating path, means operated by said members in moving through said operating paths of motion for operating associated mechanisms to perform associated functions, means whereby said members in moving through said unoperating paths of motion retain said associated mechanisms inoperative, means including a single stop member independently of the position of said typewheel and shaft for controlling a first predetermined one of said function mechanisms, means including a second stop member independently of said typewheel and shaft for controlling a plurality of said function mechanisms and means operated by said second stop member whereby said first predetermined function mechanism is included in said last mentioned plurality.

24. In a cyclically operable telegraph receiver responsive to received permutation code signals, a typewheel shaft stop unit including a series of notched discs and a plurality of selectable members, said members being selected by entering rows of aligned notches in said discs, a plurality of floating levers, cyclically operating means associated with said floating levers, a plurality of function mechanisms, a function operating link extending between said function mechanisms and associated of said floating levers, sliding members individually associated with said floating levers, means including said cyclically operating means for moving said floating levers and said slidable members, locks for said slidable members controlled by said selectable members, means effective on the locking of said sliding members to operate associated of said floating levers to move associated function operating links to operate associated function mechanisms, means controlled by a first one of said selectable members for controlling a first one of said sliding member locks and means controlled by a second one of said selectable members to control a plurality of said sliding member locks.

25. In a cyclically operable telegraph receiver responsive to received permutation code signals, a typewheel shaft stop unit including a series of notched discs and a plurality of selectable members, said members being selected by entering rows of aligned notches in said discs, a plurality of floating levers, cyclically operating means associated with said floating levers, a plurality of function mechanisms, a function operating link extending between said function mechanisms and associated of said floating levers, sliding members individually associated with said floating levers, means including said cyclically operating means for moving said floating levers and said slidable members, locks for said slidable members controlled by said selectable members, means effective on the locking of said sliding members to operate associated of said floating levers to move associated function operating links to operate associated function mechanisms, means controlled by a first one of said selectable members for controlling a first one of said sliding member locks, means controlled by a second one of said selectable members to control a plurality of said sliding member locks and means operated by said second selectable member whereby the said first one of said sliding member locks is included in the plurality of sliding member locks controlled by said second selectable member.

26. In a cyclically operable telegraph receiver responsive to received permutation code signals, a typewheel shaft stop unit including a series of notched discs and a plurality of selectable members, said members being selected by entering rows of aligned notches in said discs, a plurality of floating levers, cyclically operating means associated with said floating levers, a plurality of function mechanisms, a function operating link extending between said function mechanisms and associated of said floating levers, sliding members individually associated with said floating levers, means including said cyclically operating means for moving said floating levers and said slidable members, locks for said slidable members controlled by said selectable members, means effective on the locking of said sliding members to operate associated of said floating levers to move associated function operating links to operate associated function mechanisms, means controlled by the selection of a predetermined one of said selectable members to operate predetermined of said sliding member locks to unlock predetermined of said sliding members and to lock other of said sliding members.

27. In a cyclically operable telegraph receiver responsive to received permutation code signals, a typewheel shaft stop unit including a series of notched discs and a plurality of selectable members, said members being selected by entering rows of aligned notches in said discs, a plurality of elements pivotable about two points thereon, operating means for said elements, a plurality of function mechanisms one associated with each of said elements, means controlled by said selectable elements independently of the condition of the typewheel shaft of said stop unit to select the pivot point of said elements, and means controlled by said elements in pivoting about one of said two points to operate associated function mechanism.

28. In a printing telegraph machine selectively controlled in accordance with received code groups of impulses, a series of primary selector levers, means including a signal responsive device and a first independently rotatable member for selectively positioning said selectors, a series of secondary selector levers, means including a second independently rotatable member for transferring the setting of said primary selector levers to said secondary selector levers, a recording mechanism, means including said secondary selector levers for controlling said recording mechanism, means including a third independently rotatable member for operating said recording mechanism as controlled by said secondary selector levers, means controlled by said signal responsive device to initiate the rotation of said first rotatable member, means controlled by said first rotatable member to initiate the rotation of said second rotatable member, means controlled by said second rotatable member to initiate the rotation of said third rotatable member, a power driven shaft and means including said shaft for supporting and driving said second and third rotatable members.

29. In a telegraph machine selectively operative in response to received signals, a typewheel shaft with a typewheel movable along the axis thereof, a typewheel advancing mechanism for advancing said typewheel in a letter spacing direction, a typewheel return mechanism for returning said typewheel to an initial position for the beginning of a line of print, a typewheel shaft stop unit including a plurality of selectable members for stopping said shaft in selected angular positions, a floating lever, cyclically operable means for operating said floating lever, a sliding bar and a control element associated with said floating lever, said sliding bar normally being moved and said control element remaining substantially stationary on operation of said floating lever, means for locking said slidable member, means controlled by a predetermined one of said selectable members to operate said locking means to lock said sliding bar against movement by said floating lever whereby said floating lever operates said control element to render said typewheel return mechanism operative to effect the return of said typewheel to said initial position, and means controlled by the selection of a second predetermined one of said selectable members only after the advancement of said typewheel at least a predetermined distance from said initial position to operate said locking means to lock said sliding bar and effect return of said typewheel to said initial position.

30. In a cyclically operable telegraph recorder, a typewheel shaft, a typewheel axially movable along said shaft, a typewheel shaft stop unit including a series of selectable members for selectively stopping rotation of said shaft, a plurality of function mechanisms each including floating levers with operating means therefor and individually associated sliding members, locking members for locking said sliding members, said sliding members when locked causing associated floating levers to perform related functions, a first and a second latching means normally holding predetermined of said locking members out of locking engagement with associated sliding members, means controlled by predetermined of said selectable members for operating one of said latching means, and means controlled by the position of said typewheel on said shaft for controlling the other of said latching means whereby said locking member locks predetermined sliding members to effect performance of related functions on the selection of said predetermined selectable member with said typewheel in predetermined position along said shaft.

ROBERT F. DIRKES.
THOMAS E. MELICK.
ERNEST W. HEWITT.
JAMES W. LONG.